(12) United States Patent
Zanger et al.

(10) Patent No.: US 10,962,963 B2
(45) Date of Patent: Mar. 30, 2021

(54) ROBOT TO PICK UP AND TRANSPORT OBJECTS AND METHOD USING SUCH A ROBOT

(71) Applicant: MAGAZINO GMBH, Munich (DE)

(72) Inventors: Lukas Zanger, Munich (DE); Timo Flamm, Herbolzheim (DE); Daniel Schwab, Munich (DE); Joachim Steven, Munich (DE); Stephan Wetzel, Munich (DE); Kai Franke, Munich (DE)

(73) Assignee: MAGAZINO GMBH, Munich (DE)

( * ) Notice: Subject to any disclaimer, the term of this patent is extended or adjusted under 35 U.S.C. 154(b) by 0 days.

(21) Appl. No.: 16/070,176

(22) PCT Filed: Jan. 11, 2017

(86) PCT No.: PCT/EP2017/050457
§ 371 (c)(1),
(2) Date: Jul. 13, 2018

(87) PCT Pub. No.: WO2017/121747
PCT Pub. Date: Jul. 20, 2017

(65) Prior Publication Data
US 2019/0033837 A1 Jan. 31, 2019

(30) Foreign Application Priority Data
Jan. 14, 2016 (EP) .................................... 16151220

(51) Int. Cl.
*B66F 9/06* (2006.01)
*B66F 9/14* (2006.01)
(Continued)

(52) U.S. Cl.
CPC ........ *G05B 19/41865* (2013.01); *B25J 5/007* (2013.01); *B25J 9/1612* (2013.01);
(Continued)

(58) Field of Classification Search
CPC .. B66F 9/125; B66F 9/147; B66F 9/06; B66F 9/063; B25J 5/007
See application file for complete search history.

(56) References Cited

U.S. PATENT DOCUMENTS 4,298,099 A * 11/1981 Isaacs ...................... B65G 1/02
186/27
4,492,504 A 1/1985 Hainsworth et al. ......... 414/273
(Continued)

FOREIGN PATENT DOCUMENTS

| CN | 104354155 A | 2/2015 |
| CN | 104875177 A | 9/2015 |

(Continued)

OTHER PUBLICATIONS

Korean Office Action dated Jan. 11, 2020, issued to Korean Application No. 10-2018-7023448.
(Continued)

*Primary Examiner* — Kaitlin S Joerger
(74) *Attorney, Agent, or Firm* — Stein IP, LLC

(57) ABSTRACT

A robot is adapted to pick up and transport objects and comprises a base plate, a drive unit, a pick up unit and a shelf unit, wherein the drive unit, the pick up unit and the shelf unit are positioned on the base plate. In addition, a method of transporting at least one object, comprising: providing the robot, the robot going to a first storing location where a first object is stored, the robot picking up the first object, and the robot transporting the first object to a first destiny location.

11 Claims, 25 Drawing Sheets

Figure 1:
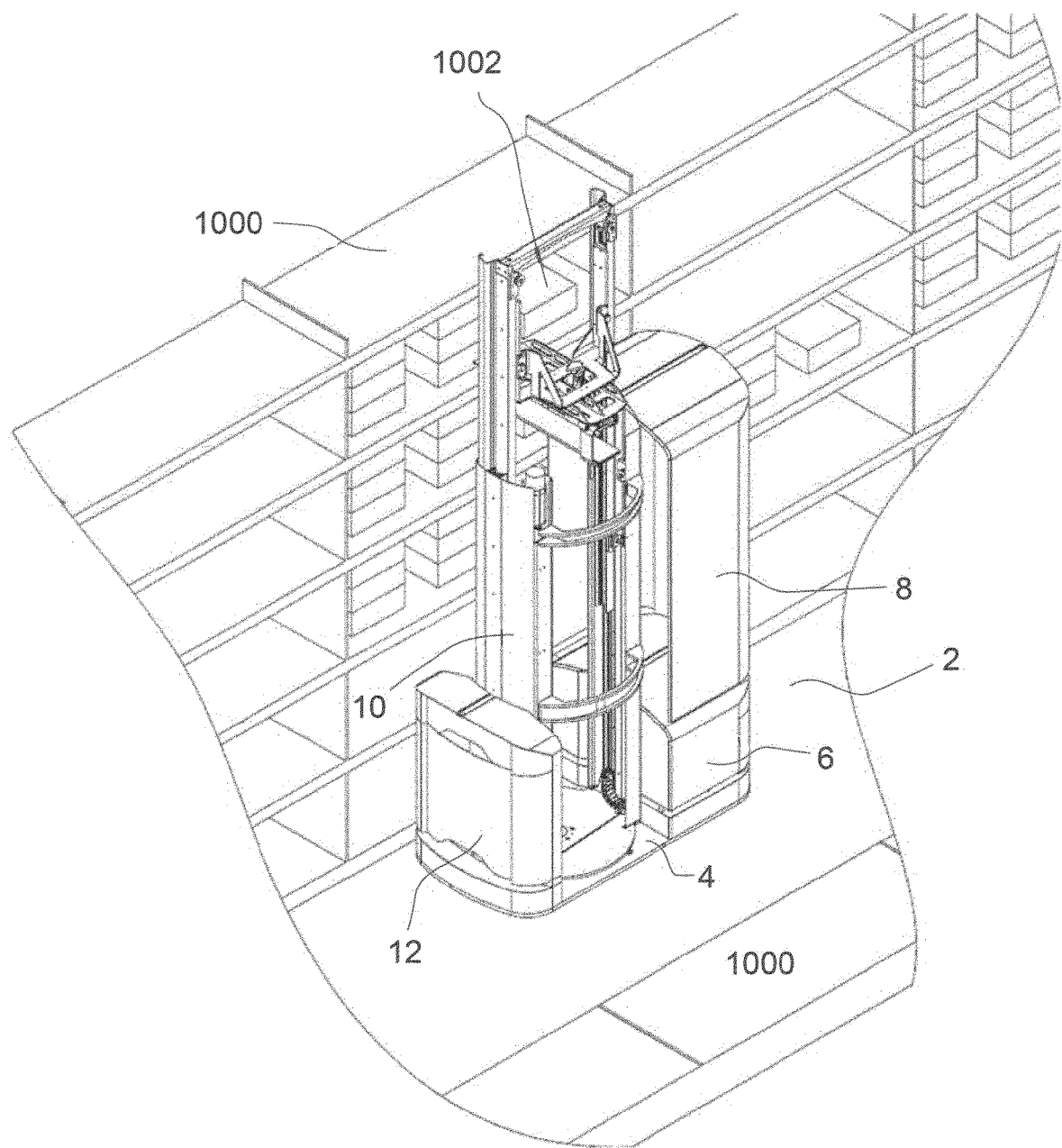

(51) Int. Cl.
  *B65G 1/04*   (2006.01)
  *G05B 19/418*   (2006.01)
  *B25J 5/00*   (2006.01)
  *B25J 18/02*   (2006.01)
  *B25J 9/16*   (2006.01)

(52) U.S. Cl.
  CPC .............. *B25J 18/025* (2013.01); *B66F 9/06* (2013.01); *B66F 9/063* (2013.01); *B66F 9/147* (2013.01); *B65G 1/0407* (2013.01); *G05B 2219/40006* (2013.01); *G05B 2219/40298* (2013.01)

(56) References Cited

U.S. PATENT DOCUMENTS

| | | | |
|---|---|---|---|
| 4,678,390 A | 7/1987 | Bonneton et al. | 414/282 |
| 4,698,775 A | 10/1987 | Koch et al. | 364/478 |
| 5,570,990 A | 11/1996 | Bonora et al. | 414/543 |
| 7,243,001 B2 | 7/2007 | Janert et al. | 700/214 |
| 7,591,630 B2 | 9/2009 | Lert, Jr. | 414/807 |
| 7,765,780 B2 | 8/2010 | Koselka et al. | 56/10.2 |
| 7,904,191 B2 | 3/2011 | Rossi et al. | 700/99 |
| 8,165,718 B2 | 4/2012 | Ota et al. | 700/259 |
| 8,688,275 B1 | 4/2014 | LaFary et al. | 700/255 |
| 8,696,010 B2 | 4/2014 | Toebes et al. | 280/400 |
| 8,718,814 B1 | 5/2014 | Clark et al. | 700/214 |
| 8,798,784 B1 | 8/2014 | Clark et al. | 700/214 |
| 8,918,202 B2 | 12/2014 | Kawano | 700/216 |
| 8,965,561 B2 | 2/2015 | Jacobus et al. | 700/216 |
| 8,988,845 B2* | 3/2015 | Guo | B66F 9/07 361/213 |
| 9,002,506 B1 | 4/2015 | Agarwal et al. | 700/216 |
| 9,089,969 B1 | 7/2015 | Theobald | |
| 9,233,470 B1 | 1/2016 | Bradski et al. | 318/568.16 |
| 9,242,799 B1 | 1/2016 | O'Brien et al. | 700/214 |
| 9,327,952 B1* | 5/2016 | Kolharkar | B66F 9/127 |
| 9,428,336 B2* | 8/2016 | Hagen | G07F 11/165 |
| 9,434,558 B2 | 9/2016 | Criswell | 700/214 |
| 9,452,894 B2 | 9/2016 | Puchwein et al. | |
| 9,466,046 B1 | 10/2016 | Theobald | |
| 9,487,357 B1 | 11/2016 | Miele et al. | |
| 9,499,338 B2 | 11/2016 | Toebes et al. | 700/218 |
| 9,513,627 B1 | 12/2016 | Elazary et al. | |
| 9,519,882 B2 | 12/2016 | Galluzzo et al. | 700/218 |
| 9,540,171 B2 | 1/2017 | Elazary et al. | |
| 9,555,978 B1 | 1/2017 | Hanssen et al. | |
| 9,557,740 B2 | 1/2017 | Crawley | 318/568.11 |
| 9,580,002 B2 | 2/2017 | Jochim et al. | |
| 9,592,759 B1 | 3/2017 | Theobald | 414/338 |
| 9,600,798 B2 | 3/2017 | Battles et al. | |
| 9,604,358 B1 | 3/2017 | Brazeau | |
| 9,637,310 B1 | 5/2017 | Zou | |
| 9,637,318 B2 | 5/2017 | Messina | 198/860.1 |
| 9,785,911 B2* | 10/2017 | Galluzzo | B25J 5/007 |
| 10,046,912 B2* | 8/2018 | Behling | B66F 9/07513 |
| 10,147,069 B2* | 12/2018 | Galluzzo | B25J 5/007 |
| 10,227,176 B2* | 3/2019 | Sugahara | B65G 1/0492 |
| 10,315,843 B2* | 6/2019 | Magens | G05D 1/021 |
| 10,343,881 B2* | 7/2019 | Guo | |
| 2006/0280581 A1* | 12/2006 | Castegren | B65G 1/0407 414/267 |
| 2007/0144991 A1* | 6/2007 | Hansl | B65G 1/0407 211/121 |
| 2009/0136331 A1* | 5/2009 | Muser | B65G 1/0407 414/529 |
| 2010/0057246 A1* | 3/2010 | Hansl | B65G 1/0407 700/215 |
| 2011/0170998 A1 | 7/2011 | Winkler | 414/564 |
| 2013/0209203 A1* | 8/2013 | Rafols | B65G 1/0407 414/279 |
| 2013/0216337 A1* | 8/2013 | Rafols | B66F 9/07 414/279 |
| 2014/0079518 A1* | 3/2014 | Qi | B66F 9/07 414/632 |
| 2015/0073589 A1 | 3/2015 | Khodl et al. | 700/218 |
| 2015/0081089 A1 | 3/2015 | Kapust et al. | 700/218 |
| 2015/0360865 A1 | 12/2015 | Massey | |
| 2016/0107838 A1 | 4/2016 | Swinkels et al. | |
| 2016/0129592 A1 | 5/2016 | Saboo et al. | |
| 2016/0176638 A1 | 6/2016 | Toebes | |
| 2016/0236867 A1 | 8/2016 | Brazeau et al. | |
| 2016/0244263 A1* | 8/2016 | Kolharkar | B66F 9/127 |
| 2017/0001305 A1 | 1/2017 | Kogan | |
| 2017/0072558 A1 | 3/2017 | Reynolds et al. | |
| 2017/0080566 A1 | 3/2017 | Stubbs et al. | |
| 2017/0114553 A1 | 4/2017 | Raman et al. | |
| 2017/0121109 A1 | 5/2017 | Behling | |
| 2017/0152106 A1 | 6/2017 | Hofmann | |
| 2018/0022548 A1* | 1/2018 | Mattern | B65G 1/0492 414/279 |
| 2018/0305124 A1* | 10/2018 | Guo | B66F 9/063 |

FOREIGN PATENT DOCUMENTS

| | | |
|---|---|---|
| CN | 105082154 A | 11/2015 |
| DE | 10 2013 106 640 B4 | 2/2015 |
| DE | 10 2014 007 539 A1 | 11/2015 |
| DE | 10 2015 212 171 B3 | 6/2016 |
| DE | 10 2015 114 410 A1 | 3/2017 |
| EP | 0 169 156 A1 | 1/1986 |
| EP | 0235 488 A1 | 3/1986 |
| EP | 0 302 205 | 2/1989 |
| EP | 0 302 205 A2 | 2/1989 |
| EP | 0 458 722 A1 | 5/1991 |
| EP | 1 570 324 B1 | 12/2003 |
| EP | 2 132 008 B1 | 3/2008 |
| EP | 1 997 751 A1 | 12/2008 |
| EP | 2 315 714 B1 | 7/2009 |
| EP | 2 865 621 B1 | 10/2013 |
| EP | 3 192 616 A1 | 7/2017 |
| JP | S 61-2603 A | 1/1986 |
| JP | H 04-28700 A | 1/1992 |
| JP | H 05-170315 A | 7/1993 |
| JP | 2004-115146 A | 4/2004 |
| JP | 2006-341957 A | 12/2006 |
| WO | WO 2014/165439 A2 | 10/2014 |
| WO | WO 2015/035300 A1 | 3/2015 |
| WO | WO 2015/074755 A2 | 5/2015 |
| WO | WO 2016/023869 A2 | 2/2016 |
| WO | WO 2016/138101 A1 | 9/2016 |
| WO | WO 2017/036747 A1 | 3/2017 |

OTHER PUBLICATIONS

Korean Office Action dated Jul. 20, 2020, issued to Korean Application No. 10-2018-7023448.

Chinese Office Action dated Dec. 1, 2020, issued by the China National Intellectual Property Administration in corresponding application CN 201780006518.8.

* cited by examiner

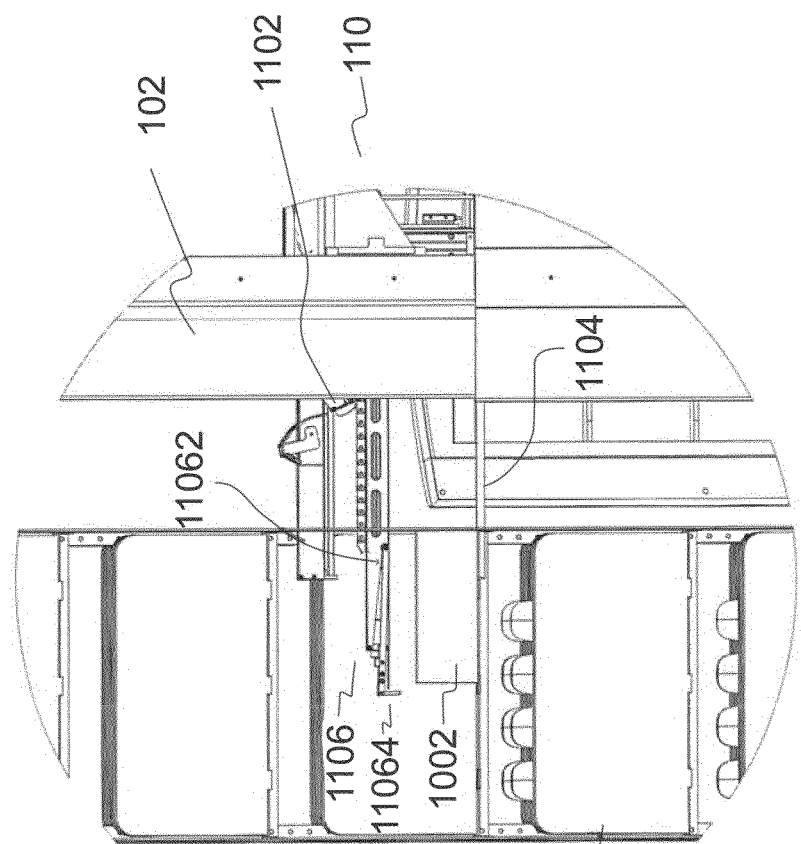
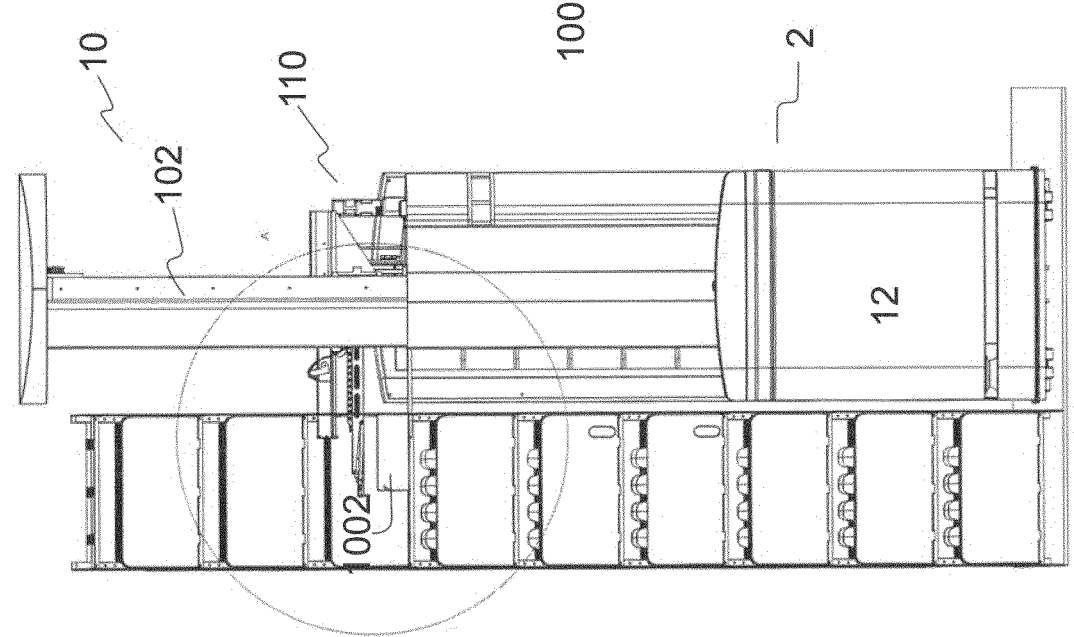

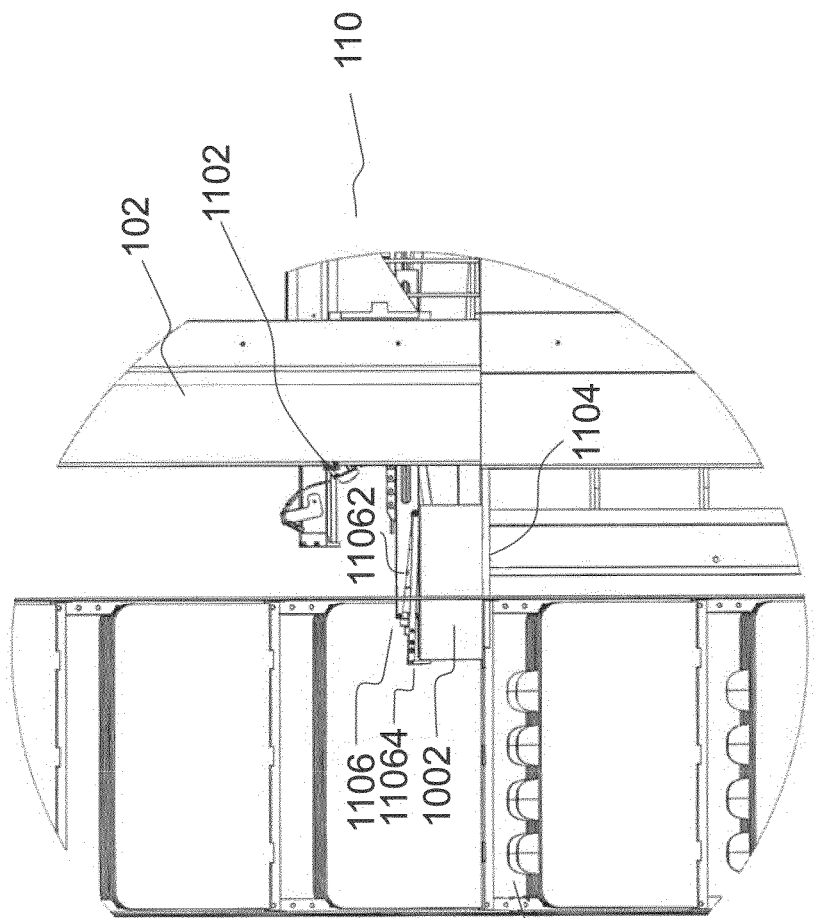
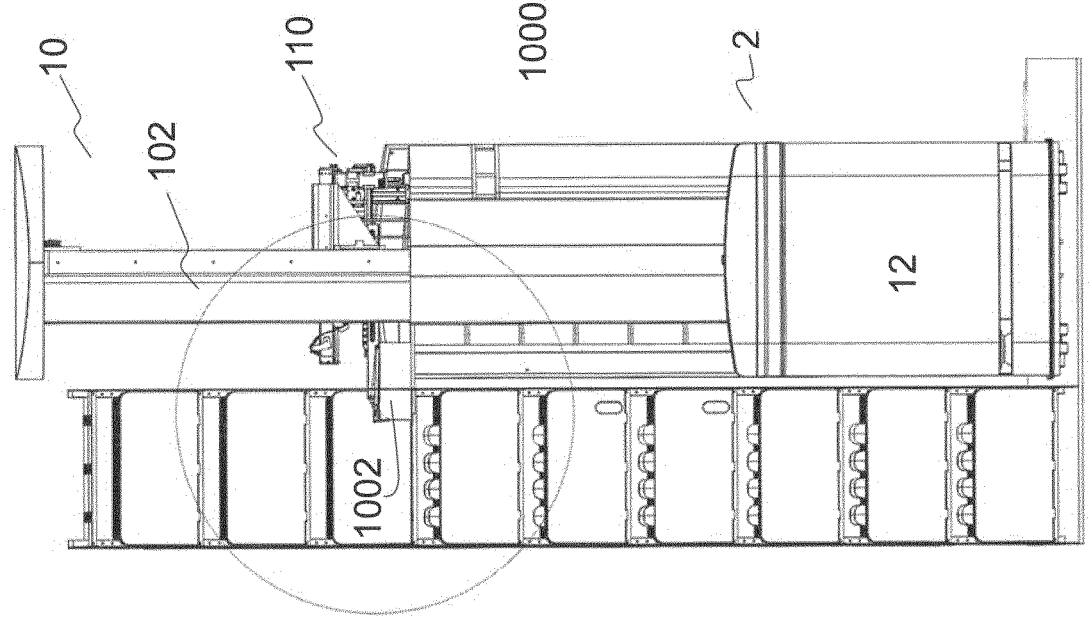
Fig. 20b
Fig. 20a

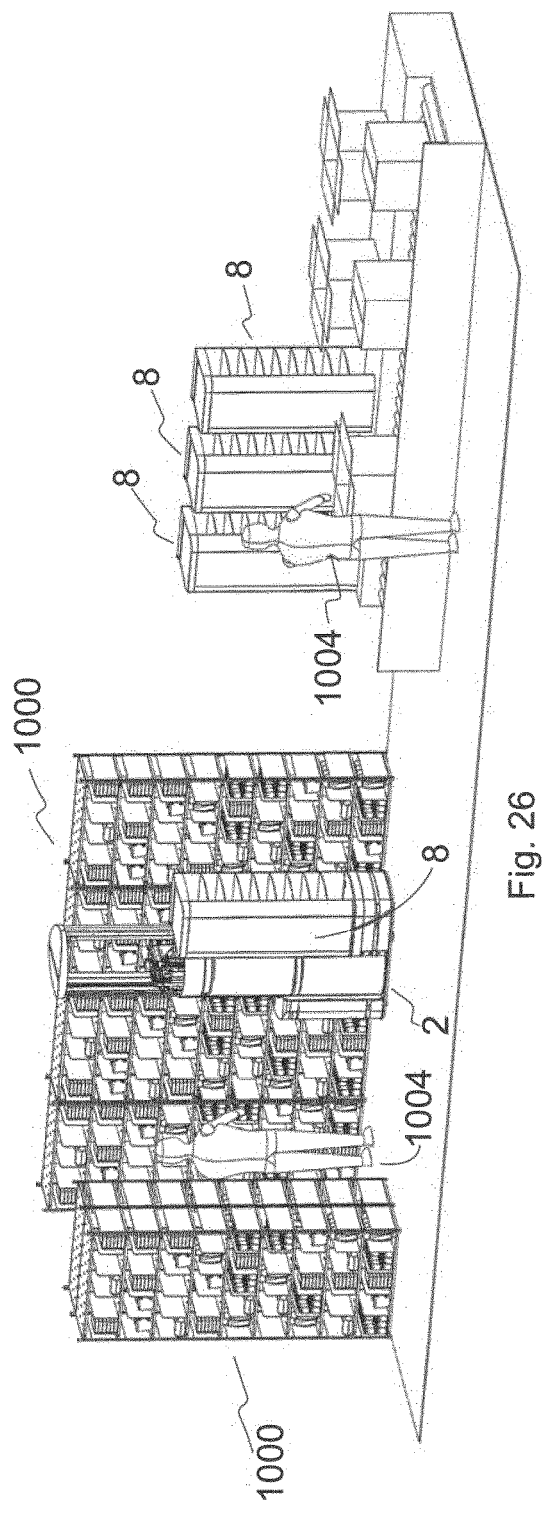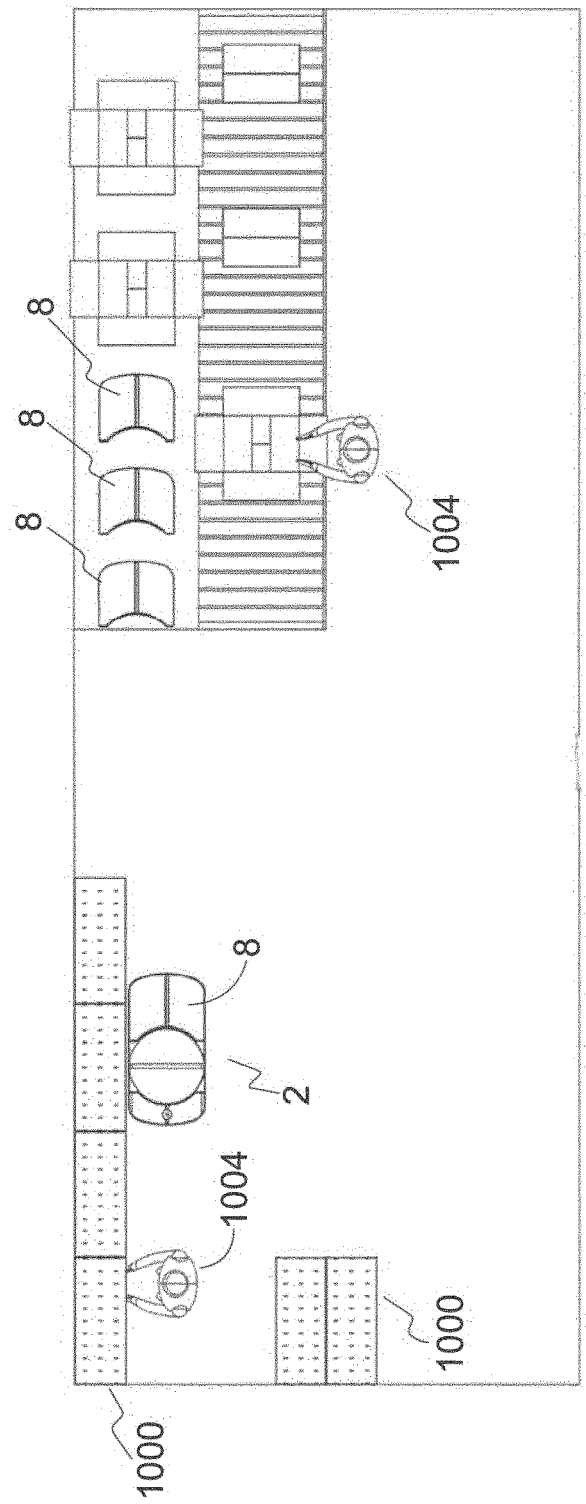

ROBOT TO PICK UP AND TRANSPORT OBJECTS AND METHOD USING SUCH A ROBOT

CROSS-REFERENCE TO RELATED APPLICATIONS

This application is a national stage of International Application No. PCT/EP2017/050457 filed Jan. 11, 2017, which claims the benefit of priority to European Application No. 16151220.7, filed Jan. 14, 2016, in the European Patent Office, the disclosures of which are incorporated herein in their entireties by reference.

The present invention generally relates to a robot. More particularly, the present invention relates to a robot adapted to pick up and transport objects from one location to another. The present invention also relates to a method employing such a robot.

During recent years, the online commerce has increased. In a typical scenario, a customer may order a product or more generally an object from a supplier. The supplier will then ship the desired object to the customer. To do so, the supplier will typically have a warehouse, storing a plurality of objects, which may be shipped to a plurality of different customers. In particular, warehouses allowing humans to pick up the objects are envisaged by the present invention, e.g., warehouses having shelves with a height in the range of 2.5 to 3.0 m such as 2.5 to 2.6 m. However, the present invention may also be useful for other warehouses, such as high rack warehouses. When an order is received by the supplier, there is the task of finding the object that has been ordered in the warehouse and bringing it to the location where it may be shipped. Typically, a person may walk to the location in the warehouse where the desired object is stored, pick up the object and bring it to the shipping location. Such a procedure may be disadvantageous and undesired for a plurality of reasons. As an initial matter, having the objects to be shipped picked by a person may be prone to failure, i.e., the person may—unintentionally—pick the wrong object. Furthermore, having such a simple task performed by a person may be frustrating for the person and may be relatively cost intensive. In addition, it may be difficult for a person to reach the highest racks in a warehouse. Moreover, people working in such a warehouse may fall ill, thereby reducing the overall efficiency of the transporting system within the warehouse. People working in such a warehouse may also have preferred times to fulfil their tasks (e.g., performing the tasks during the day may be more preferred than performing the same during the night), potentially leading to a varying degree of capacity utilization of such a system to transport the objects from the racks to the location for shipping.

Some attempts have been made trying to alleviate the shortcomings of an entirely human based picking system.

Firstly, these include the automation of the "picking by humans" systems. In addition to a conventional list used by humans to pick up the correct objects and transport them to a desired location (which list may have items to be "ticked" by a human once the objects are at the desired location), e.g., bar codes may be on the objects, which bar codes may be scanned by the user picking up and transporting the objects (these systems may also be referred to as "pick by paper" and "pick by scan" systems, respectively). Furthermore, the racks where the objects are stored may be provided with lights. When a certain object is to be picked, the system may activate the light where the object is located to indicate the respective location to the user ("pick by light"). Furthermore, the user may be provided, e.g., with a headset and the system may communicate the location of the objects to the user via this headset. The user may then also indicate to the system when a respective object has been picked by a voice message to the system ("pick by voice"). Moreover, data goggles may be used. Such data goggles may serve as augmented reality goggles to provide the wearer with additional information, such as where an object to be picked is stored. Furthermore, such goggles may include a camera to detect the environment surrounding the wearer. Thus, it may detect which step the wearer is performing (e.g., whether he has already picked up a respective object). This may also be referred as "pick by vision". All the technologies described in this paragraph relate to the automation of the picking by humans. They provide the user with additional equipment to facilitate the picking of the objects. However, they "remotely control" the user, which may be frustrating to the user, as the tasks to be performed by the user become even more mechanical. Furthermore, such systems still require a human to perform the main tasks of walking to the locations where the objects are located, picking up the objects and bringing the objects to the desired location, e.g., for shipping, which may be both relatively cost intensive and prone to failure.

Secondly, some attempts have been made to realize systems bringing the objects in the storage units to the user for further processing. These include carousel racks—i.e. racks that may rotate either vertically ("paternoster rack") or horizontally. Thus, instead of the user going to the correct location where an object to be shipped is stored, such systems will bring the respective section of the rack to the user. In such systems, the objects are typically stored in plastic boxes which are brought close to the user by rotation of the racks, such that the user may open the respective box and pick the respective object. Some robots have been developed which are adapted to carry complete racks. Such robots may load the respective rack where a desired object is stored and bring the rack to the user who may then pick up the respective object from the rack. Other attempts include automated small part warehouses. In such warehouses, storage units, such as boxes, store small parts. When a small part is to be shipped, a robot picks up the storage unit, i.e., the box, which is then transported to the user, e.g., by means of a conveyer belt or by rail based systems. The user may then open the storage unit and pick the desired object for shipping. However, as will be understood, such systems attempting to bring the objects to the user for shipping are also far from optimal, as they require a particular design and set up of the warehouse, which is typically associated with substantial investment costs. Moreover, these systems are not particularly flexible and prone to overall system failure—e.g., if there is an error in a carousel rack system, it is likely that the complete system will fail and will be unusable until the error is fixed. Furthermore, these systems still require a large amount of human interaction.

The present invention seeks to overcome or at least alleviate the shortcomings and disadvantages of the prior art. It is therefore an object of the present invention to provide a device, which is able to pick up and transport objects, preferably without the need of a human user. Particularly, the present invention allows single and individual objects to be picked up. It is also an object of the present invention to provide a corresponding method. Further objects of the present invention pertain to additional improvements in such devices and methods.

These objects are met by the robot and the method of the present invention.

Inter alia, the present invention is directed to a robot comprising a base plate, a drive unit and a pick up unit. Such a robot may allow individual objects to be picked up and transported from one location to another, e.g., in a warehouse.

The robot may be adapted to pick up and transport objects. Preferably, the robot is adapted to pick up individual objects, such as books.

The robot may be a mobile or autonomously driving robot. This may differentiate the robot from so called industrial robots used, e.g., in the car assembly. Classical industrial robots fulfill certain commands in a very particular and defined environment. In contrast thereto, an autonomously driving or navigating robot does not only follow certain and fixed commands, but rather "behaves" in accordance to certain rules. This allows the robot to work in a more versatile environment than the environments where classical industrial robots are employed. Thus, the robot may be employed in warehouses and side by side with human users.

The drive unit and the pick up unit may be positioned on the base plate. In other words, when viewed from a side, the drive unit and the pick up unit are positioned above the base plate and when viewed from the top, the drive unit and the pick up unit overlap the base plate. That is, when viewed from the top, the drive unit and the pick up unit are positioned within the area delimited by the base plate.

The robot further may comprise an energy storage unit, such as a battery unit. The energy storage unit may be positioned on the base plate. The energy storage unit and the pick up unit may be located side by side to one another. The pick up unit may be located between the energy storage unit and the drive unit.

The robot may further comprise a shelf unit. The shelf unit may be removable from the remainder of the robot. The robot may be adapted to mount and/or un-mount the shelf unit from the remainder of the robot. The shelf unit may comprise at least one case board and preferably a plurality of case boards. The at least one case board may be displaceable in a vertical direction. In other words, the shelf unit may comprise one or more compartments and the dimensioning of the compartments may be altered, e.g., to facilitate transportation of different objects (having different shapes and/or sizes) therein. When reference is made to a vertical direction, such a direction relates to the direction in an in-use configuration. The robot may be adapted to displace the displaceable case board(s) in the vertical direction. The shelf unit may be located on top of the drive unit. The shelf unit may be positioned on the base plate. Such a shelf unit may allow the robot to transport different objects at the same time. It may therefore be a particularly preferred form for the robot to have such a shelf unit. The pick up unit may be adapted to put objects into the shelf unit.

The drive unit and the pick up unit may be located side by side to one another.

The pick up unit may comprise at least one bar positioned perpendicular to the base plate. In other words, the at least one bar is positioned vertically when the robot is in a use position. The at least one bar may be consistently positioned in above described configuration, that is, it may be adapted not to assume another configuration during use. In other words, the at least one bar may be adapted to assume only the position perpendicular to the base plate. Such a configuration of the pick up unit comprising one or more bars may lead to a particularly simple, stable and fail safe pick up unit adapted to pick up objects having a weight of several kg. The at least one bar may be two bars. In other words, in this embodiment, the pick up unit comprises two bars positioned perpendicular to the base plate. That is, the two bars are also positioned parallel to one another. The pick up unit may comprise a connector bar connecting the two bars, preferably at a side opposite to the base plate. The pick up unit may comprise at least one connector member connecting the two bars at locations intermediate to longitudinal ends of the two bars, wherein there are preferably two or more such connector members.

The pick up unit may comprise a pick up device adapted to pick up and release objects, which pick up device is linearly movable along the bar(s). The robot may be adapted to rotate the pick up device around an axis perpendicular to the base plate. The pick up device may be adapted to simultaneously pick up a plurality of objects.

In one embodiment, where the robot comprises the above feature and the shelf unit, the robot may pick up an object when the pick up device is rotated in a first orientation. The pick up device may then be rotated to a second orientation to place the object into the shelf unit, where the object is released and stored for transportation.

The pick up device itself may be rotatable around the axis.

The pick up unit may comprise a pick up unit support plate, which is rotatably mounted on the base plate and wherein the at least one bar may be mounted on the pick up unit support plate.

The pick up unit support plate may have a thickness in the range of 3 to 30 mm, preferably 5 to 15 mm and further preferably 9 to 11 mm, such as 10 mm. In other words, the pick up unit support plate may have a thickness not exceeding 30 mm, 15 mm or 11 mm.

The at least one bar may be telescopable between a retracted and an extended position. In other words, the at least one bar may be length adjustable between retracted and extended positions. The difference between the most extended and the most retracted position may be in the range of 50 to 150 cm, preferably 70 cm to 110 cm and further preferably 80 cm to 95 cm, such as 87 cm. This may enable the robot to reach objects in relatively high locations, while at the same time allowing the robot to drive via locations having a relatively low clearance.

The base plate may have a thickness in the range of 5 to 40 mm, preferably 10 to 20 mm and further preferably 14 to 16 mm, such as 15 mm. In other words, the base plate may have a thickness not exceeding 40 mm, 20 mm or 16 mm.

The robot further may comprise a plurality of wheels. The robot may further comprises at least one motor driving at least one of the wheels. Particularly, the robot may comprise two motors and two of the wheels are driven by the motors, wherein each motor drives one wheel, respectively. At least one wheel driven by a motor (and preferably all such wheels) may extend through the base plate. A portion of the vertical diameter of the at least one motor driven wheel may be disposed above the base plate, wherein this portion is at least 25%, preferably at least 50%, more preferably at least 75% of the diameter, such as approximately 85%.

The base plate may comprise a downward facing surface adapted to face to the ground in use and an upward facing surface opposite to the downward facing surface, wherein the upward facing surface in use is distanced from the ground by a distance in the range of 15 to 70 mm, preferably 30 to 40 mm, more preferably 33 to 35 mm, such as 34 mm. In other words, the upward facing surface may be distanced by no more than 70 mm, 40 mm or 35 mm from the ground during use.

In other words, the portions of the wheels being in contact with the ground during use, i.e., the portions being disposed "lowest" on the robot, i.e., on the side of the downward facing surface and furthest displaced from the upward facing surface, are displaced from the upward facing surface of the base plate by above distances.

By one or more of the above measures, it is possible for the pick up unit and the pick up device to be placed at a location relatively close to the ground, which may enable the robot to pick up objects from locations close to the ground, e.g., from locations being 5 to 10 cm distanced from the ground.

The robot may have a maximum height in the range of 150 cm to 350 cm, preferably 200 to 300 cm, more preferably 250 cm to 270 cm, such as 260 cm. This maximum height may correspond to the height of the robot in an extended configuration. Such a height may be particularly useful if the robot is to be used in a standard warehouse, where both robots and humans may transport the objects.

The robot may comprise a center of mass, which in use is distanced from the ground by a distance in the range of 20 cm to 100 cm, preferably 30 cm to 50 cm, more preferably 35 cm to 45 cm, such as 39 cm. That is, the center of mass of the robot in use may be distanced by no more than 100 cm, 50 cm or 35 cm from the ground. The center of mass typically corresponds to the mass of the robot without any transported objects and with the pick up unit in its lowest configuration. This allows for a particularly stable configuration of the robot.

The base plate may have a width in the range of 30 to 100 cm, preferably 40 to 80 cm, more preferably 50 to 70 cm, such as 60 cm. Such a configuration of the base plate may allow the robot to be positioned in front of a rack in a typical warehouse without the robot blocking the way between two racks. That is, with such a width, it may be possible for a human or another robot to pass a robot being positioned between racks.

The base plate may have a length in the range of 100 cm to 150 cm, such as 120 cm.

The robot further may comprise a sensor for sensing obstacles. Such a sensor may, e.g., be located in a lateral end section of the robot and may sense when obstacles are present close to the robot, e.g., when there are obstacles in the way of movement of the robot. For example, when the robot is driving in a certain direction, it may sense the presence of an obstacle in this direction, which obstacle may be, e.g., a human. The sensor could be a camera with a depth sensor or a 3D camera. Additionally or alternatively, the sensor may comprise a laser sensor for sensing the obstacles. A non limiting example of such a laser sensor is a 53000 laser scanner from SICK AG, Waldkirch.

Furthermore, the robot may also comprise at least one proximity sensor for sensing the distance between the robot and another object, e.g., a shelf.

The robot may be a freely movable robot, i.e. a robot that is free to move in a respective room. This is different, e.g., to a robot mounted on trails or the like. Such a trail based robot can only move along the trails, i.e. along predetermined routes. In contrast thereto, the robot of the present invention may be freely movable in space.

The present invention is also directed to a method of transporting at least one object. Whenever method steps are mentioned in a particular order herein, the method is preferably, but not necessarily, performed in the order in which the steps are mentioned herein, unless the order of the steps is explicitly recited.

The method comprises: providing a robot, preferably a robot as described above, the robot going to a first storing location where a first object is stored, the robot picking up a first object and the robot transporting the first object to a first destiny location.

The robot may comprise a shelf unit as explained above and the method may comprise the step of the robot placing the first object in the shelf unit.

The method may further comprise: the robot going to a second storing location where a second object is stored and the robot picking up the second object after the robot has placed the first object in the shelf unit.

The method may further comprise: the robot transporting the second object to the first destiny location or to a second destiny location.

The robot may place the second object in the shelf unit.

The robot may pick up an object from a location having a distance in the range of 30 to 150 mm, preferably 50 to 100 mm, more preferably 60 to 80 mm, such as 70 mm from the ground supporting the robot. In other words, the robot may pick up an object from a location being distanced by no more than 150 mm, 100 mm or 80 mm from the ground. It will be understood that it is envisaged that this step may be a part of picking up the first and/or the second object.

The robot may pick up an object from a location having a distance in the range of 150 to 300 cm, preferably 200 to 250 cm, more preferably 220 to 230 cm, such as 227 cm from the ground supporting the robot. In other words, the robot may pick up an object from a location being distanced by more than 150 cm, 200 cm, 220 cm from the ground. It will be understood that it is envisaged that this step may be a part of picking up the first and/or the second object.

The robot may comprise at least one bar as explained above and the robot may telescope the at least one bar from a retracted to an extended position and/or vice versa.

The robot may un-mount the shelf unit from the remainder of the robot. Another robot may mount the shelf unit to the remainder of said other robot.

The following numbered aspects pertain to the invention.

1. A robot (2) comprising
   a base plate (4),
   a drive unit (6) and
   a pick up unit (10).
2. A robot (2) according to the preceding aspect, wherein the robot (2) is adapted to pick up and transport objects (1002) and preferably to pick up individual objects (1002), e.g. books.
3. A robot (2) according to any one of the preceding aspects, wherein the robot (2) is an autonomously driving robot (2).
4. A robot (2) according to any of the preceding aspects, wherein the drive unit (6) and the pick up unit (10) are positioned on the base plate (4).
5. A robot (2) according to any one of the preceding aspects, wherein the robot (7) further comprises an energy storage unit (12), such as a battery unit.
6. A robot (2) according to the preceding aspect, wherein the energy storage unit (12) is positioned on the base plate (4).
7. A robot (2) according to any of the 2 preceding aspects, wherein the energy storage unit (12) and the pick up unit (10) are located side by side to one another.
8. A robot (2) according to any of the 3 preceding aspects, wherein the pick up unit (10) is located between the energy storage unit (12) and the drive unit (6).
9. A robot (2) according to any one of the preceding aspects, wherein the robot (2) further comprises a shelf unit (8).

10. A robot (2) according to the preceding aspect, wherein the shelf unit (8) is removable from the remainder of the robot (2).

11. A robot (2) according to the preceding aspect, wherein the robot (2) is adapted to mount and/or un-mount the shelf unit (8) from the remainder of the robot (2) 12. A robot (2) according to any of the 3 preceding aspects, wherein the shelf unit (8) comprises at least one case board (82) and preferably a plurality of case boards (82).

13. A robot (2) according to the preceding aspect, wherein the at least one case board (82) is displaceable in a vertical direction.

14. A robot (2) according to the preceding aspect, wherein the robot (2) is adapted to displace the displaceable case board(s) in the vertical direction.

15. A robot (2) according to any one of the 6 preceding aspects, wherein the shelf unit (8) is located on top of the drive unit (6).

16. A robot (2) according to any of the 7 preceding aspects, wherein the shelf unit (8) is positioned on the base plate (4).

17. A robot (2) according to any of the 8 preceding aspects, wherein the pick up unit (10) is adapted to put objects into the shelf unit (8).

18. A robot (2) according to any of the preceding aspects, wherein the drive unit (6) and the pick up unit (10) are located side by side to one another.

19. A robot (2) according to any one of the preceding aspects, wherein the pick up unit (10) comprises at least one bar (102) positioned perpendicular to the base plate (4).

20. A robot (2) according to the preceding aspect, wherein the at least one bar (102) is two bars (102).

21. A robot (2) according to the preceding aspect, wherein the pick up unit (10) comprises a connector bar (104) connecting the two bars (102), preferably at a side opposite to the base plate (4).

22. A robot (2) according to any of the 2 preceding aspects, wherein the pick up unit (10) comprises at least one connector member (122) connecting the two bars (102) at locations intermediate to longitudinal ends of the two bars (102), wherein there are preferably two or more such connector members (122).

23. A robot (2) according to any of the 4 preceding aspects, wherein the pick up unit (10) comprises a pick up device (110) adapted to pick up and release objects (1002), which pick up device (110) is linearly movable along the bar(s) (102).

24. A robot (2) according to the preceding aspect, wherein the robot (2) is adapted to rotate the pick up device (110) around an axis perpendicular to the base plate (4).

25. A robot (2) according to the preceding aspect, wherein the pick up device (110) itself is rotatable around the axis.

26. A robot (2) according to any of the 7 preceding aspects, wherein the pick up unit (100) comprises a pick up unit support plate (124), which is rotatably mounted on the base plate (4) and wherein the at least one bar (102) is mounted on the pick up unit support plate (124).

27. A robot (2) according to the preceding aspect, wherein the pick up unit support plate (124) has a thickness in the range of 3 to 30 mm, preferably 5 to 15 mm and further preferably 9 to 11 mm, such as 10 mm.

28. A robot (2) according to any of the 10 preceding aspects, wherein the at least one bar (102) is telescopable between a retracted and an extended position.

29. A robot (2) according to the preceding aspect, wherein the difference between the most extended and the most retracted position is in the range of 50 to 150 cm, preferably 70 cm to 110 cm and further preferably 80 cm to 95 cm, such as 87 cm.

30. A robot (2) according to any of the preceding aspects, wherein the base plate (4) has a thickness in the range of 5 to 40 mm, preferably 10 to 20 mm and further preferably 14 to 16 mm, such as 15 mm.

31. A robot (2) according to any of the preceding aspects, wherein the robot (2) further comprises a plurality of wheels (46, 48).

32. A robot (2) according to the preceding aspect, wherein the robot (2) further comprises at least one motor driving at least one of the wheels (46).

33. A robot (2) according to the penultimate aspect, wherein the robot (2) comprises two motors and two of the wheels (46) are driven by the motors, wherein each motor drives one wheel, respectively.

34. A robot (2) according to any of the 2 preceding aspects, wherein at least one wheel (46) driven by a motor extends through the base plate (4).

35. A robot (2) according to the preceding aspect, wherein a portion of the vertical diameter of the at least one motor driven wheel (46) is disposed above the base plate (4), wherein this portion is at least 25%, preferably at least 50%, more preferably at least 75% of the diameter, such as approximately 85%.

36. A robot (2) according to any of the preceding aspects, wherein the base plate (4) comprises a downward facing surface (402) adapted to face to the ground in use and an upward facing surface (404) opposite to the downward facing surface (402), wherein the upward facing surface (404) in use is distanced from the ground by a distance in the range of 15 to 70 mm, preferably 30 to 40 mm, more preferably 33 to 35 mm, such as 34 mm.

37. A robot (2) according to any of the preceding aspects, wherein the robot (2) has a maximum height in the range of 150 cm to 350 cm, preferably 200 to 300 cm, more preferably 250 cm to 270 cm, such as 260 cm.

38. A robot (2) according to any of the preceding aspects, wherein the robot (2) comprises a center of mass, which in use is distanced from the ground by a distance in the range of 20 cm to 100 cm, preferably 30 cm to 50 cm, more preferably 35 cm to 45 cm, such as 39 cm.

39. A robot (2) according to any of the preceding aspects, wherein the base plate (4) has a width in the range of 30 to 100 cm, preferably 40 to 80 cm, more preferably 50 to 70 cm, such as 60 cm.

40. A robot (2) according to any of the preceding aspects, wherein the robot (2) further comprises a sensor for sensing obstacles.

41. A robot (2) according to any of the preceding aspects, wherein the robot (2) is a freely movable robot (2).

Below, method aspects will be abbreviated as "M" followed by a number. Whenever method steps are mentioned in a particular order herein, the method is preferably, but not necessarily, performed in the order in which the steps are mentioned herein, unless the order of the steps is explicitly recited.

M1. Method of transporting at least one object (1002), comprising:
  providing a robot (2) according to any of the preceding aspects,
  the robot (2) going to a first storing location where a first object (1002) is stored,
  the robot (2) picking up a first object (1002),
  the robot (2) transporting the first object (1002) to a first destiny location.

M2. Method according to the preceding aspect, wherein the robot (2) comprises the features of aspect 9, the method further comprising:
   the robot (2) placing the first object (1002) in the shelf unit (8).

M3. Method according to the preceding aspect, wherein the method further comprises:
   the robot (2) going to a second storing location where a second object (1002) is stored,
   the robot (2) picking up the second object (1002) after the robot (2) has placed the first object (1002) in the shelf unit (8).

M4. Method according to the preceding aspect and further comprising:
   the robot (2) transporting the second object (1002) to the first destiny location.

M5. Method according to the penultimate aspect and further comprising:
   the robot (2) transporting the second object (1002) to a second destiny location.

M6. Method according to any of the 3 preceding aspects and further comprising:
   the robot (2) placing the second object (1002) in the shelf unit (8).

M7. Method according to any of the preceding method aspects, wherein the method comprises
   the robot (2) picking up an object (1002) from a location having a distance in the range of 30 to 150 mm, preferably 50 to 100 mm, more preferably 60 to 80 mm, such as 70 mm from the ground supporting the robot (2).

M8. Method according to any of the preceding method aspects, wherein the method comprises
   the robot (2) picking up an object (1002) from a location having a distance in the range of 150 to 300 cm, preferably 200 to 250 cm, more preferably 220 to 230 cm, such as 227 cm from the ground supporting the robot (2).

M9. Method according to any of the preceding method aspects, wherein the robot (2) comprises the features of aspect 28, the method comprising
   the robot (2) telescoping the at least one bar (102) from a retracted to an extended position and/or vice versa.

M10. Method according to any of the preceding method aspects, wherein the robot (2) comprises the features of aspect 11, the method further comprising
   the robot (2) un-mounting the shelf unit (8) from the remainder of the robot (2).

M11. Method according to the preceding aspect, the method further comprising
   another robot (2) mounting the shelf unit (8) to the remainder of said other robot (2).

Figure 2:
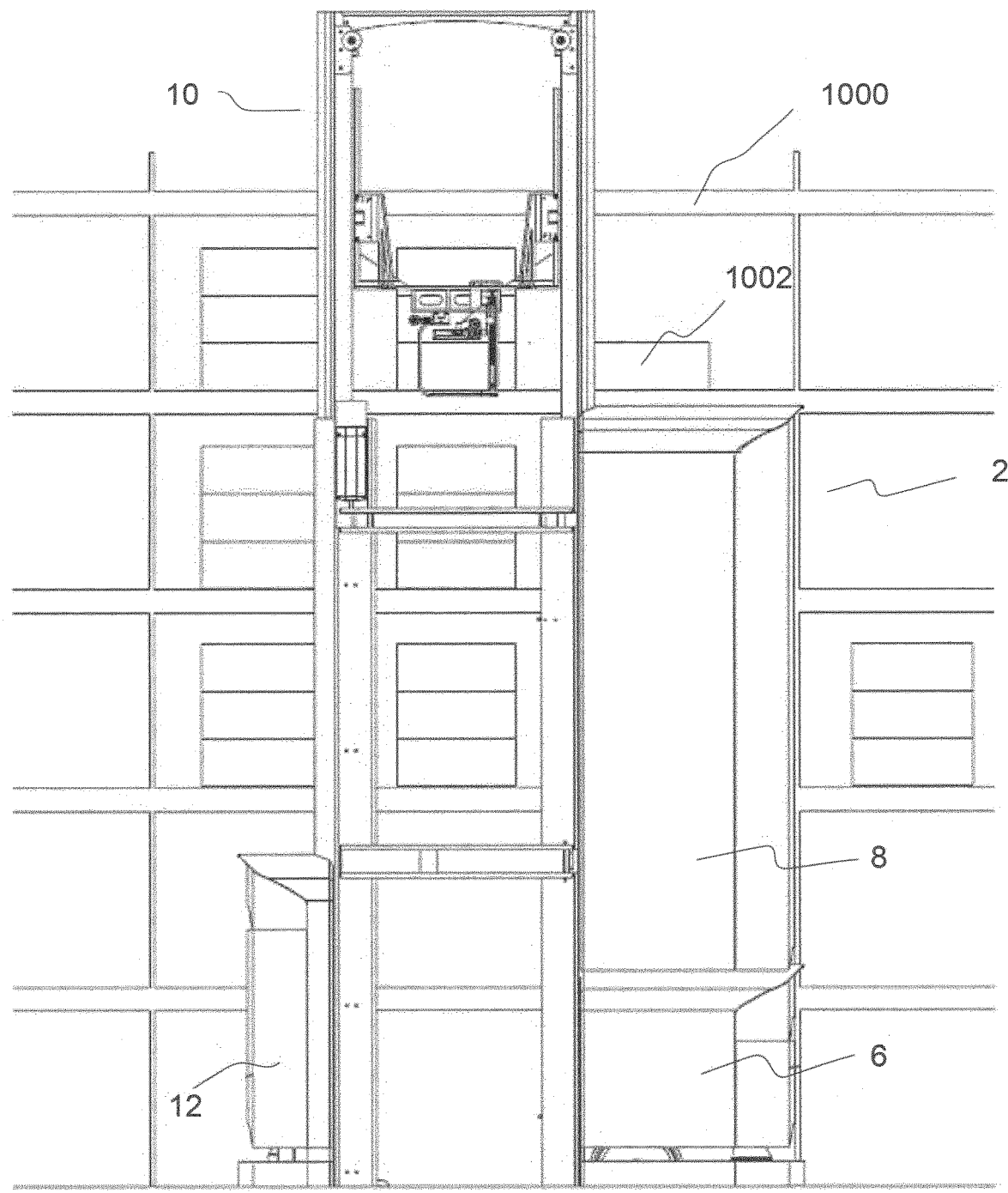
Figure 3:
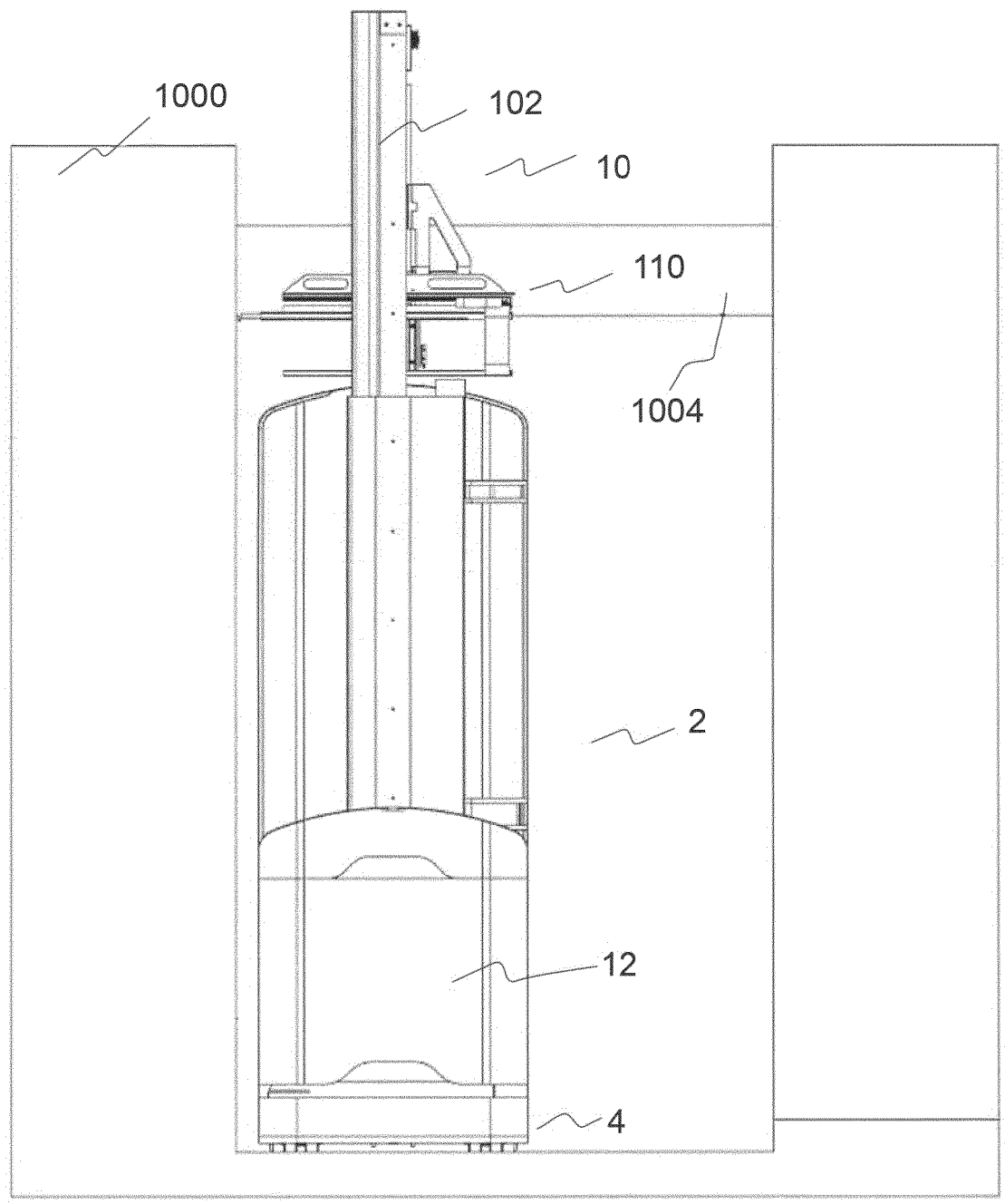
Figure 4:
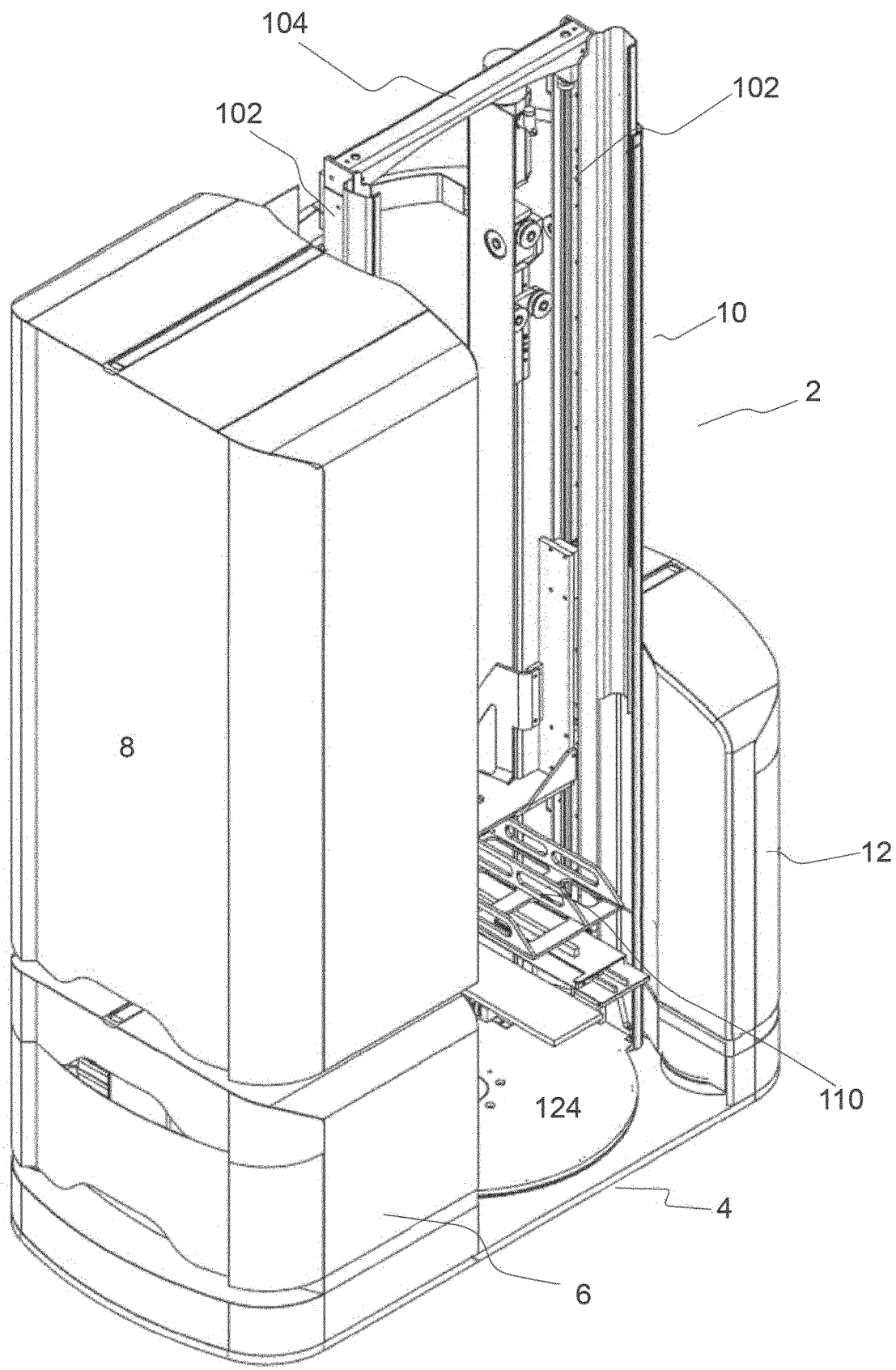
Figure 5:
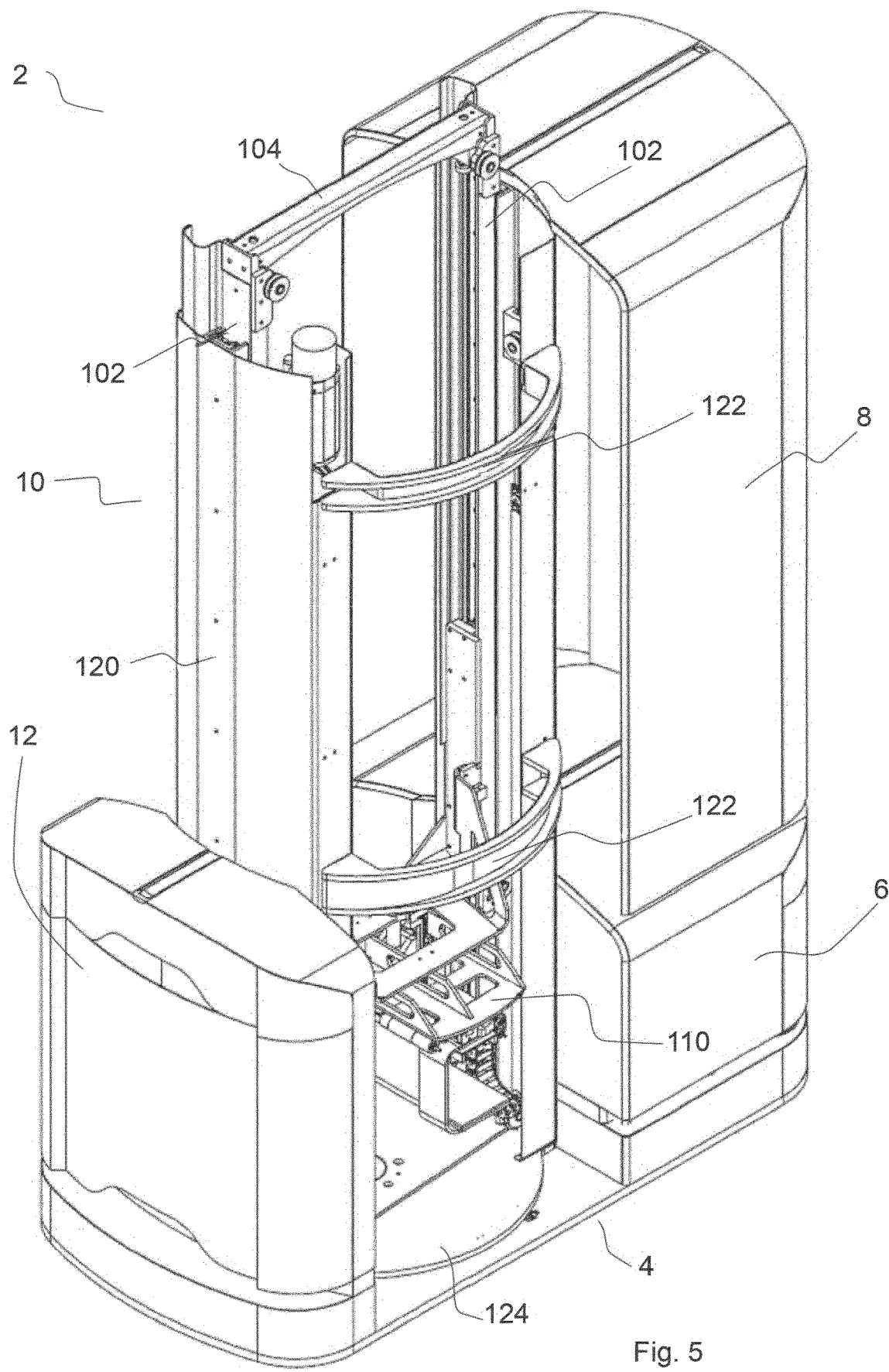
Figure 6:
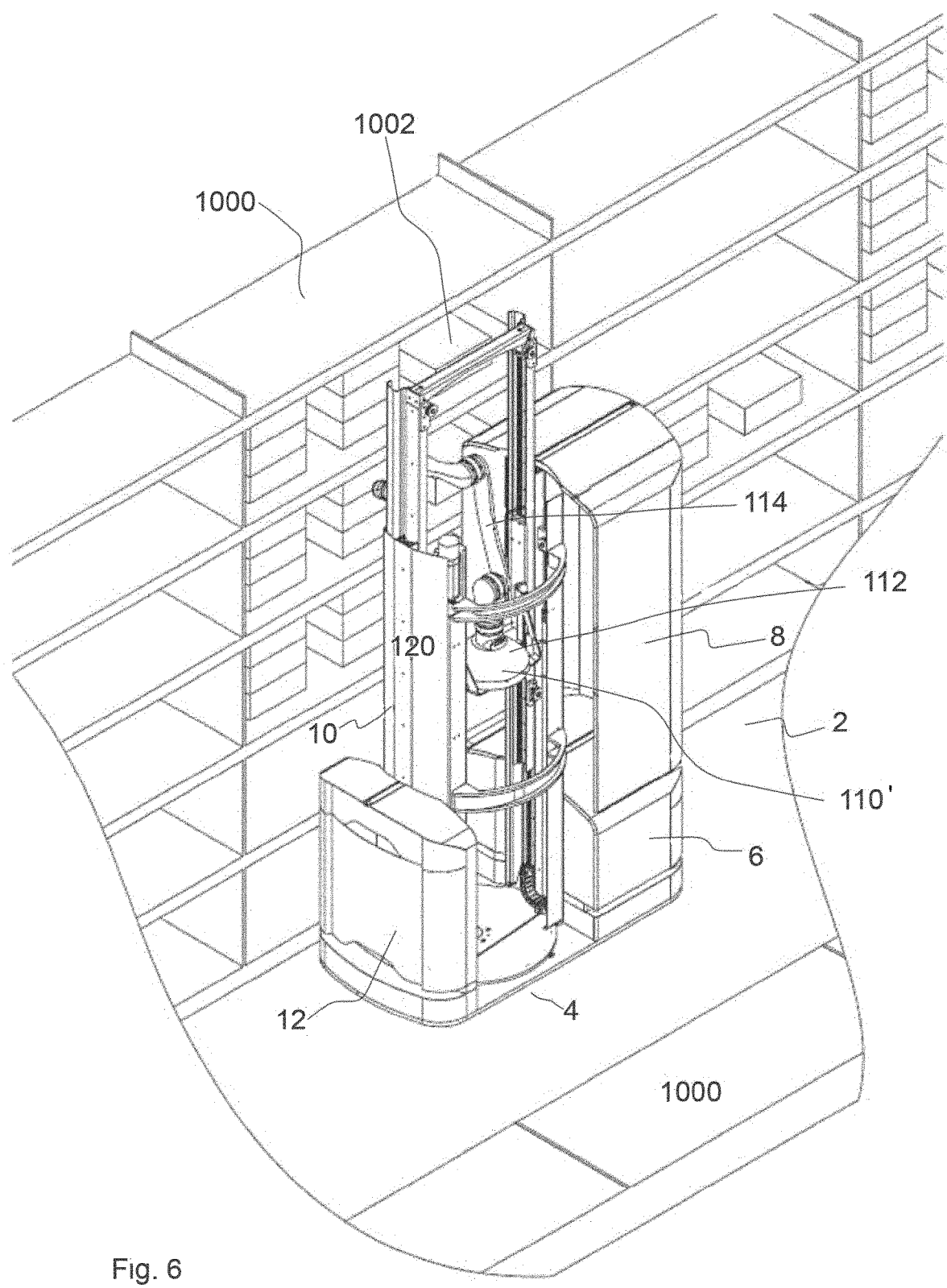
Figure 7:
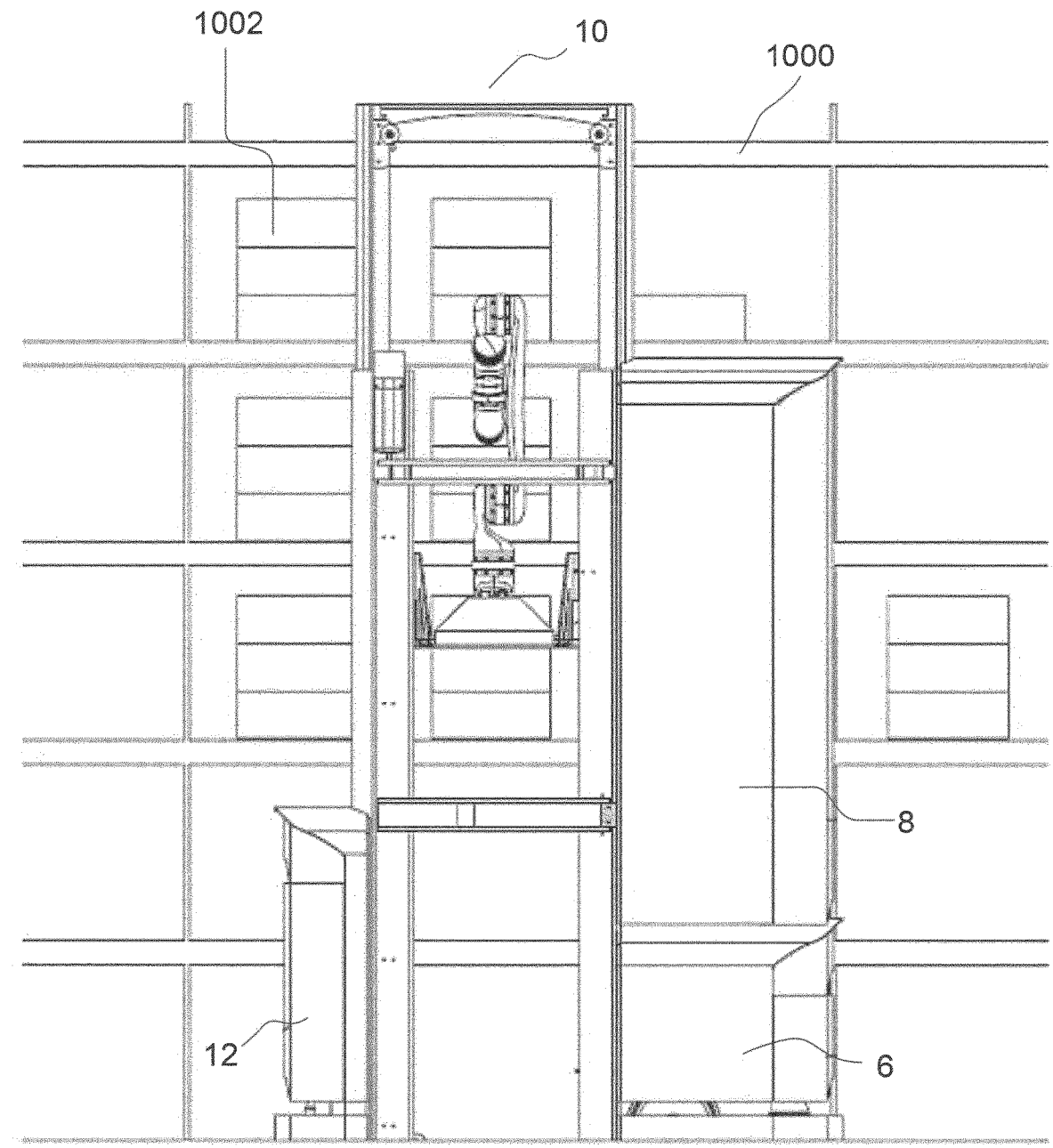
Figure 8:
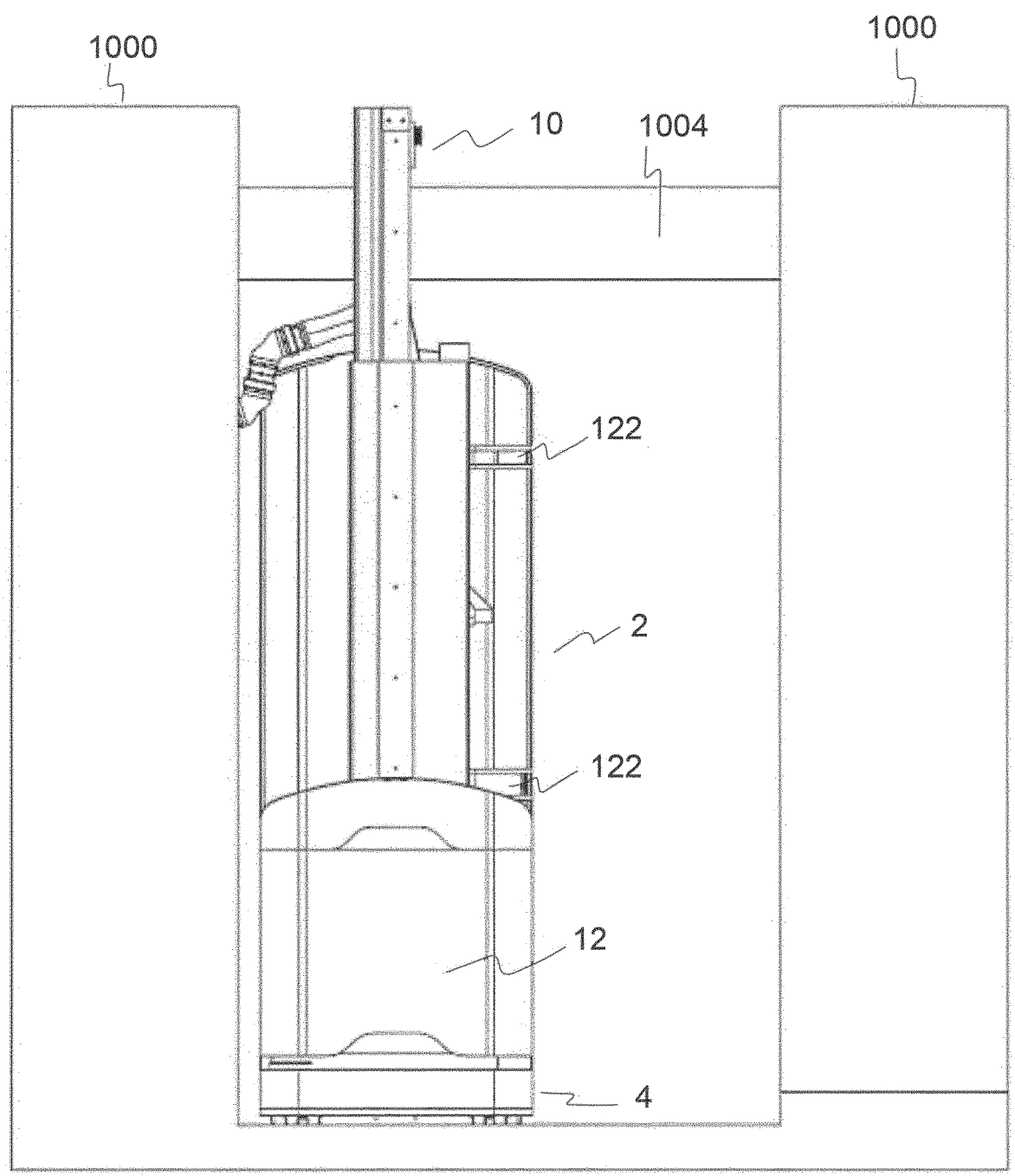
Figure 9:
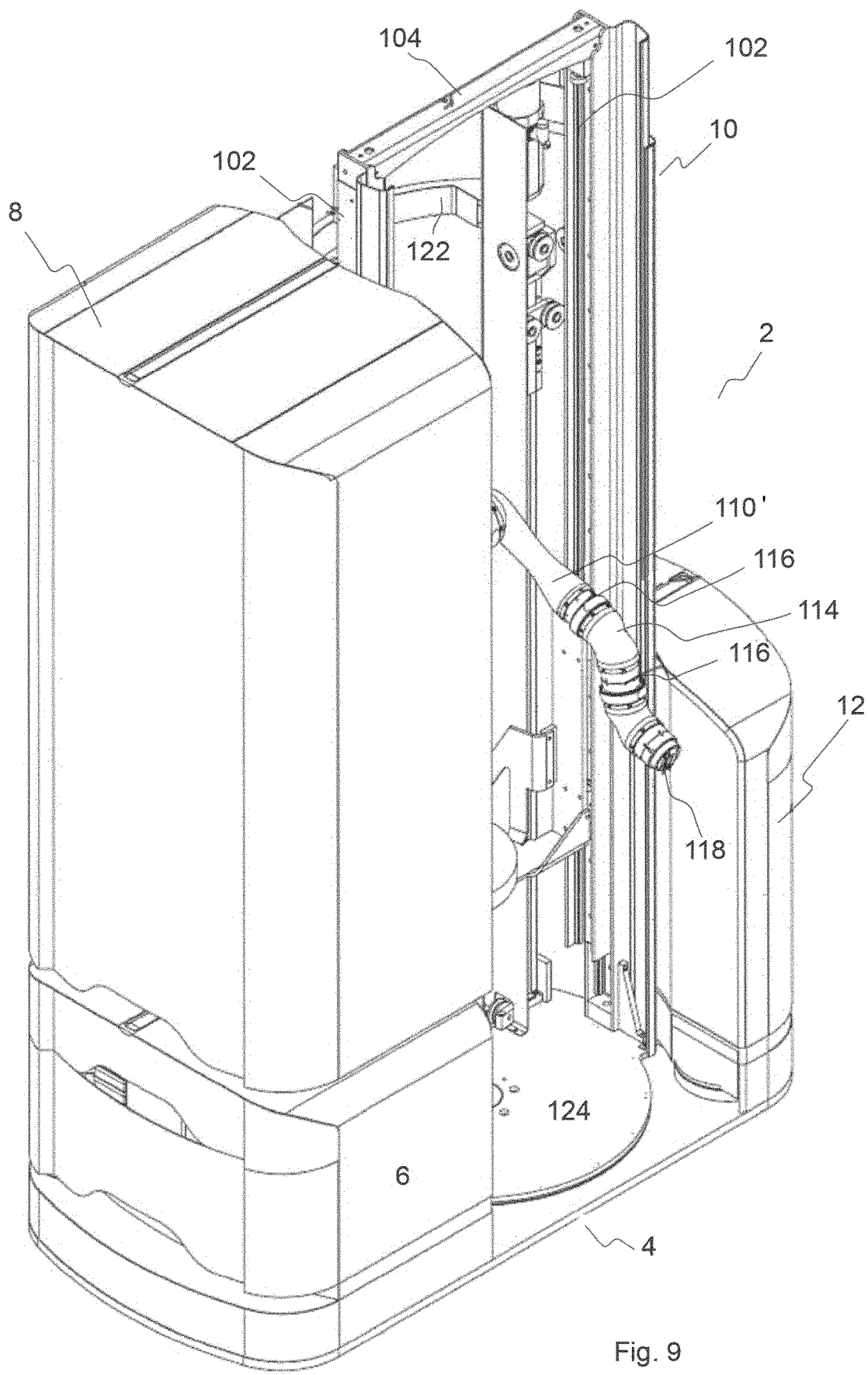
Figure 10:
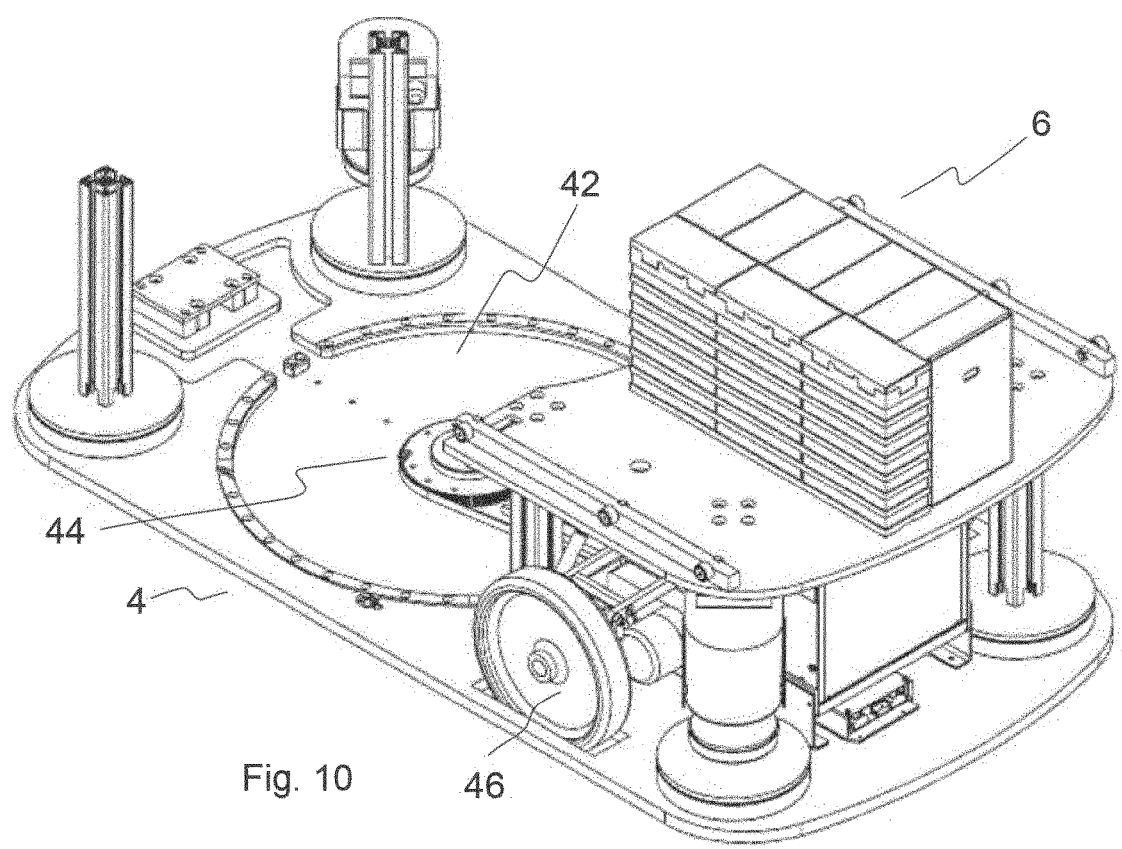
Figure 11:
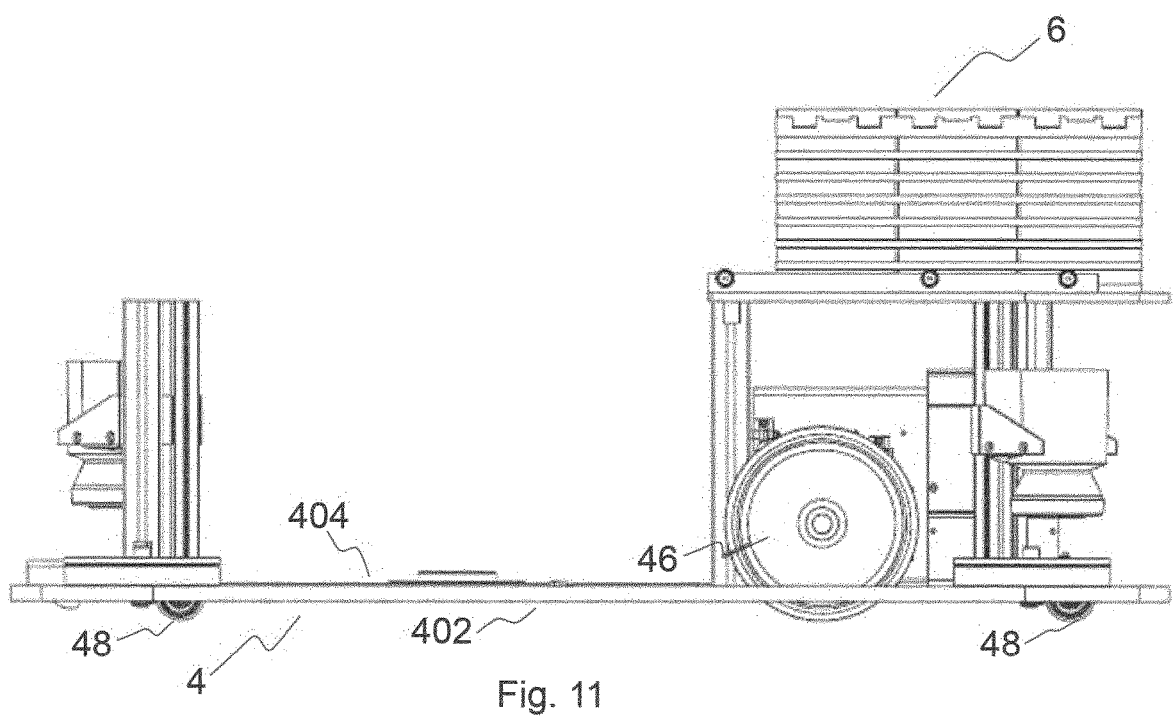
Figure 12:
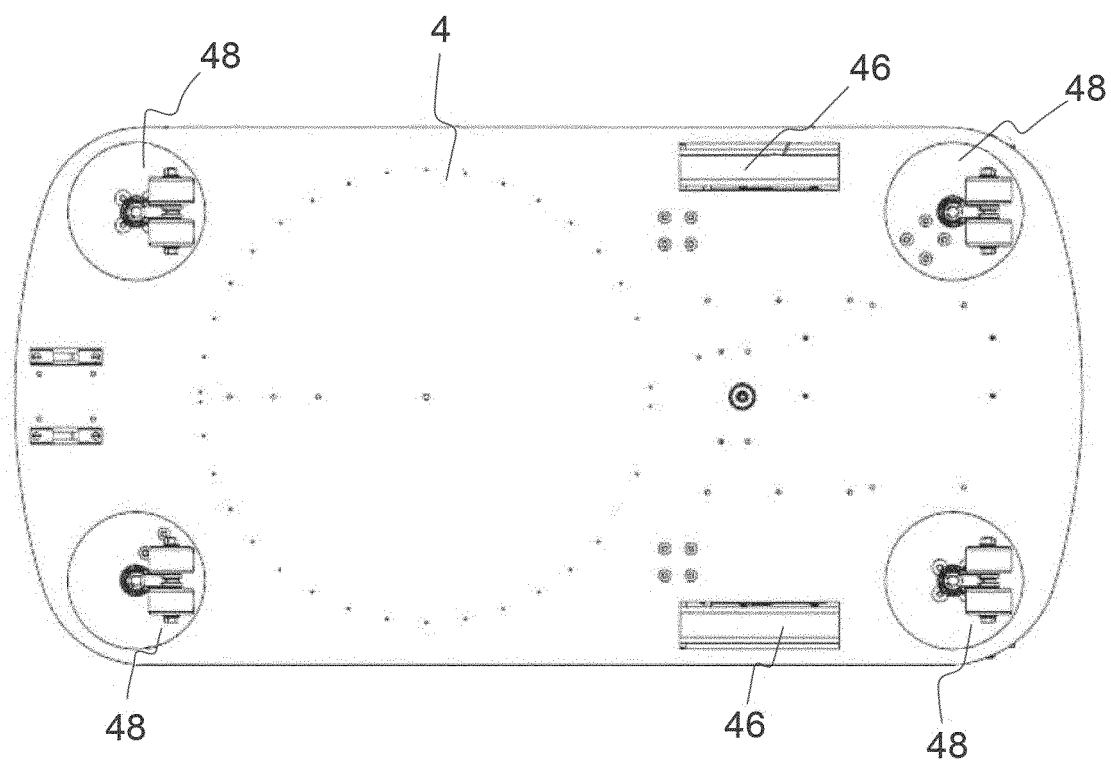
Figure 13:
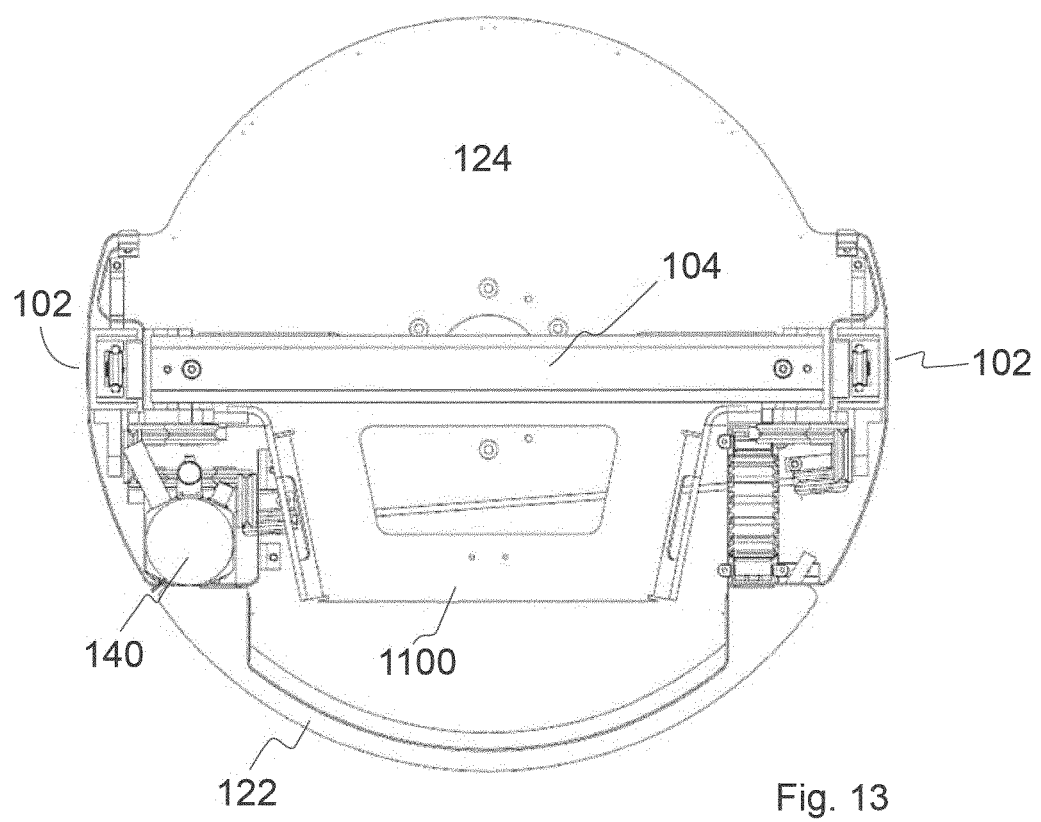
Figure 14:
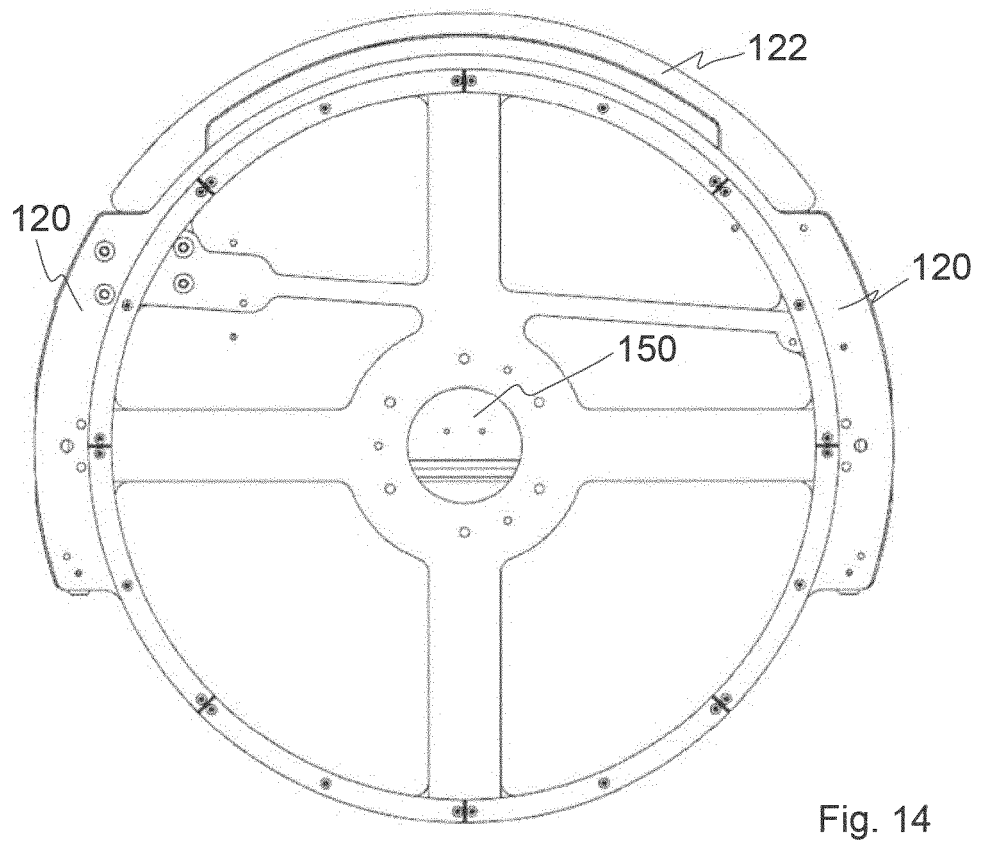
Figure 15:
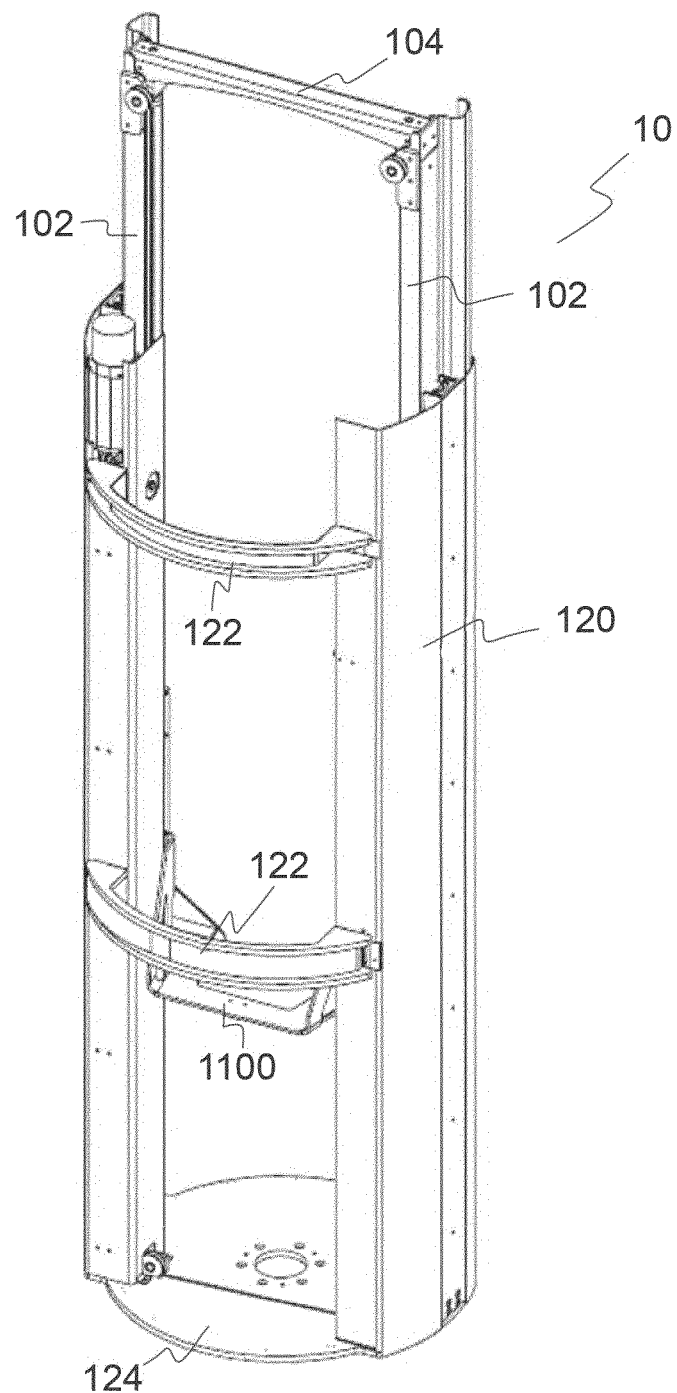
Figure 16:
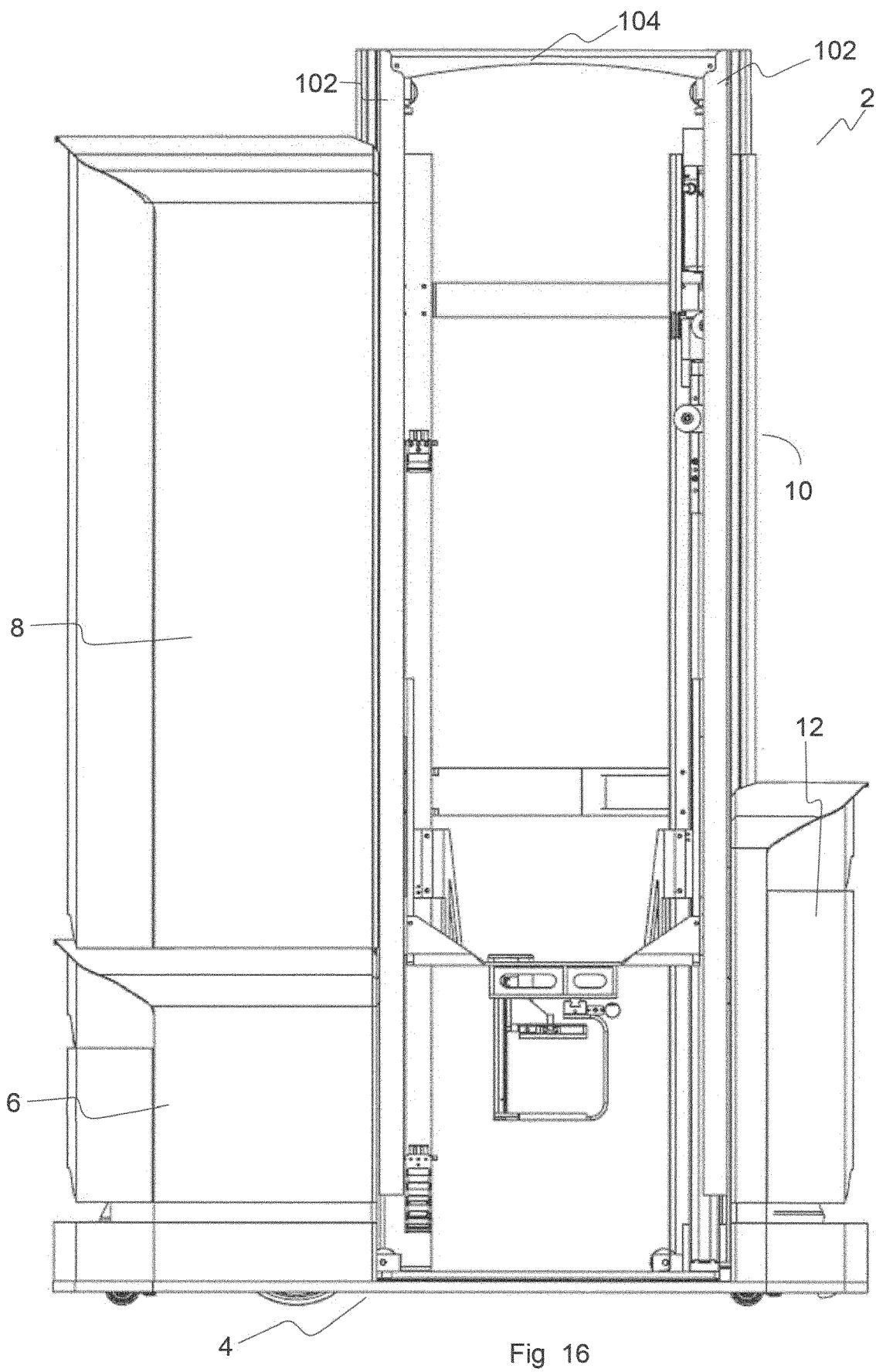
Figure 17:
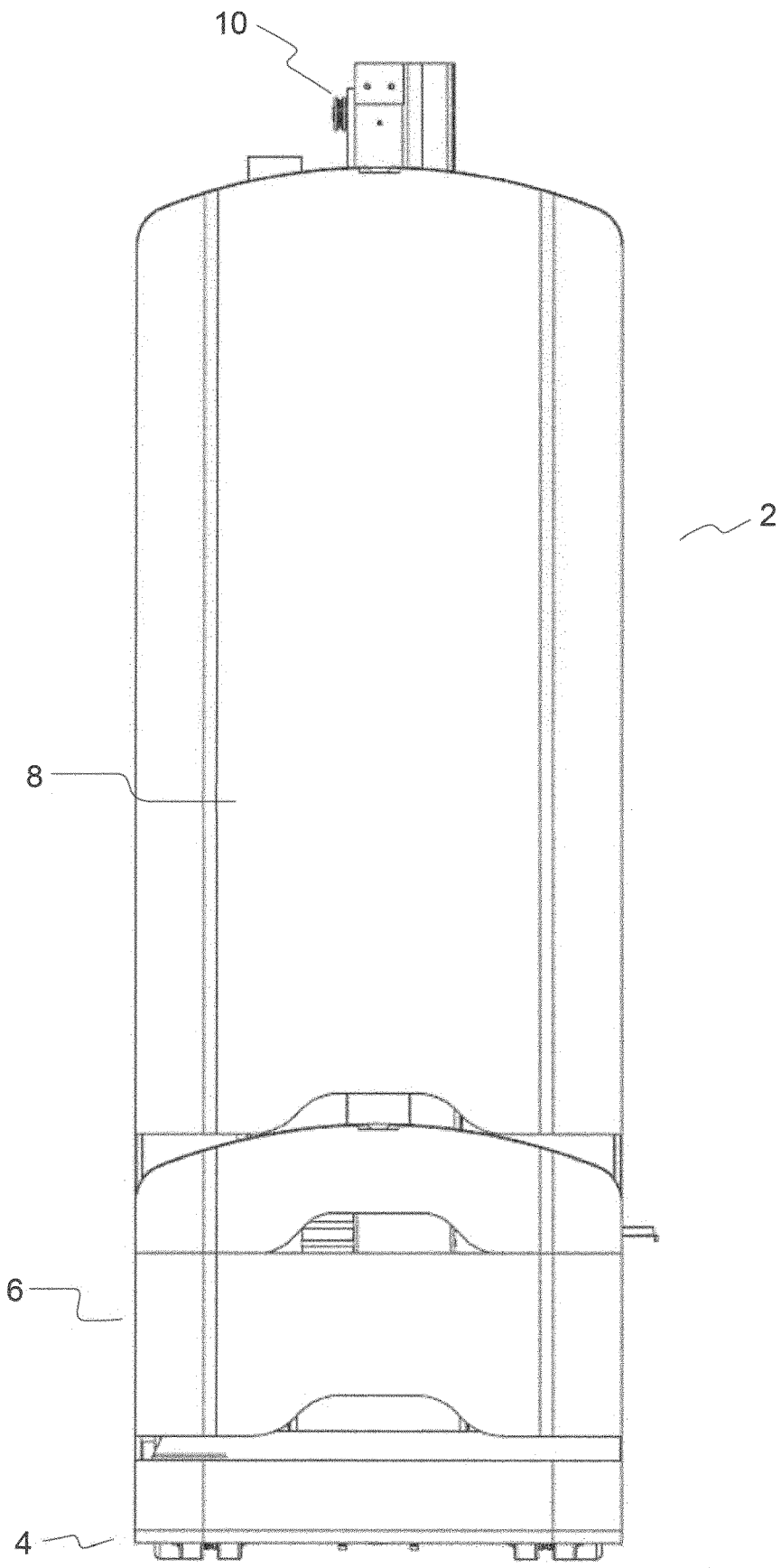
Figure 18:
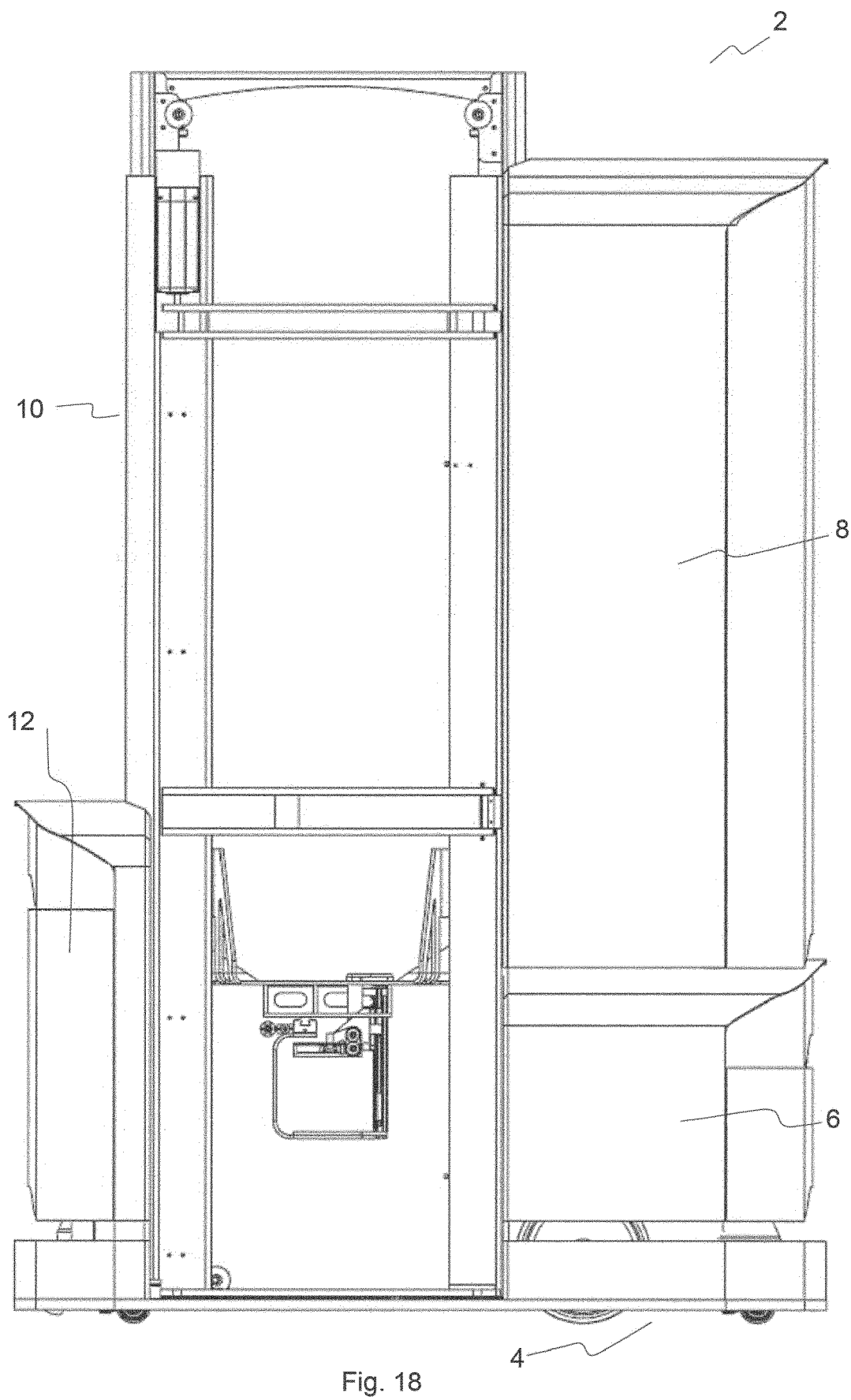
Figure 22:
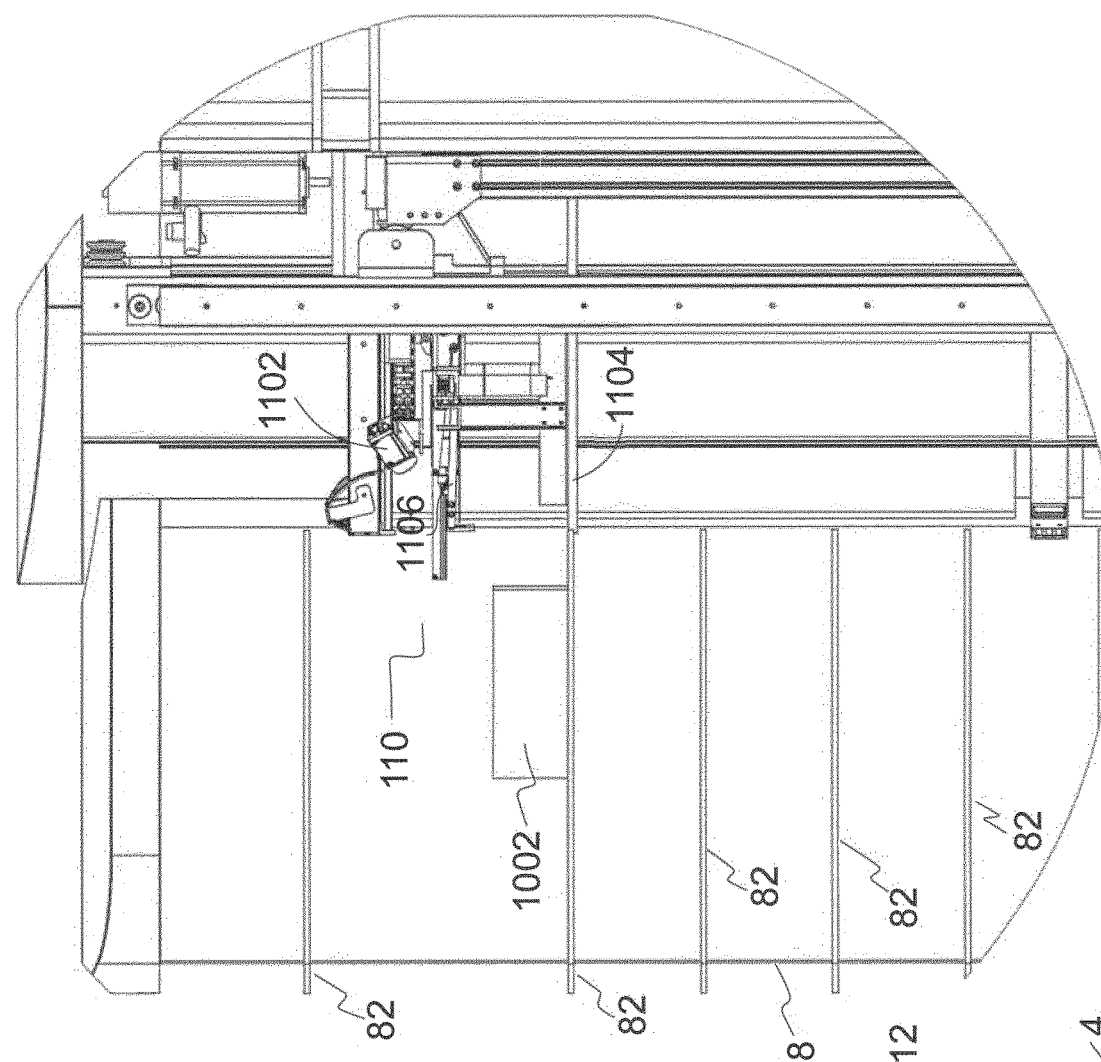
Figure 21:
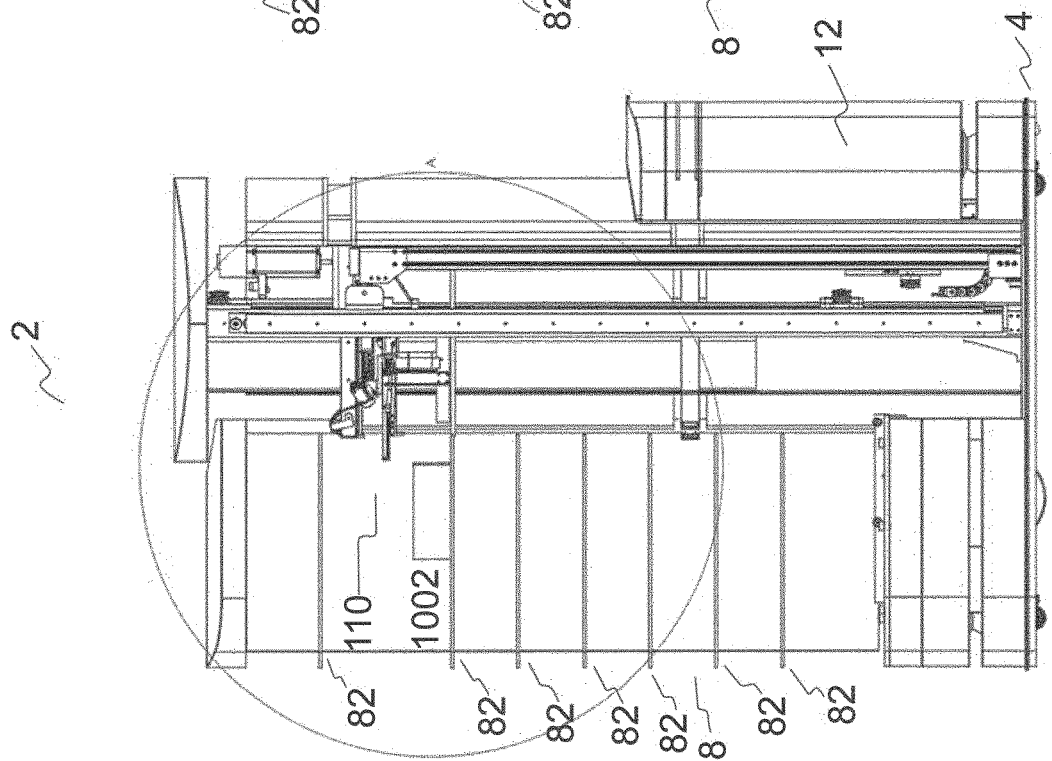
Figure 24:
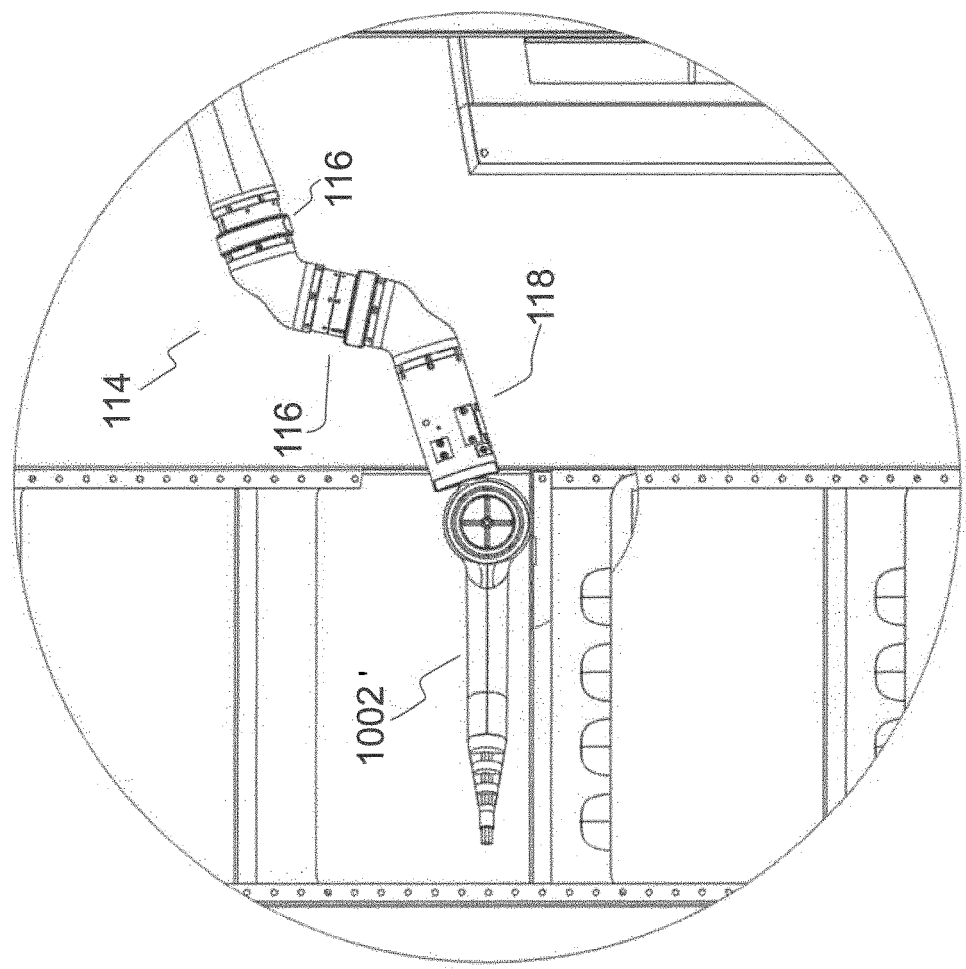
Figure 23:
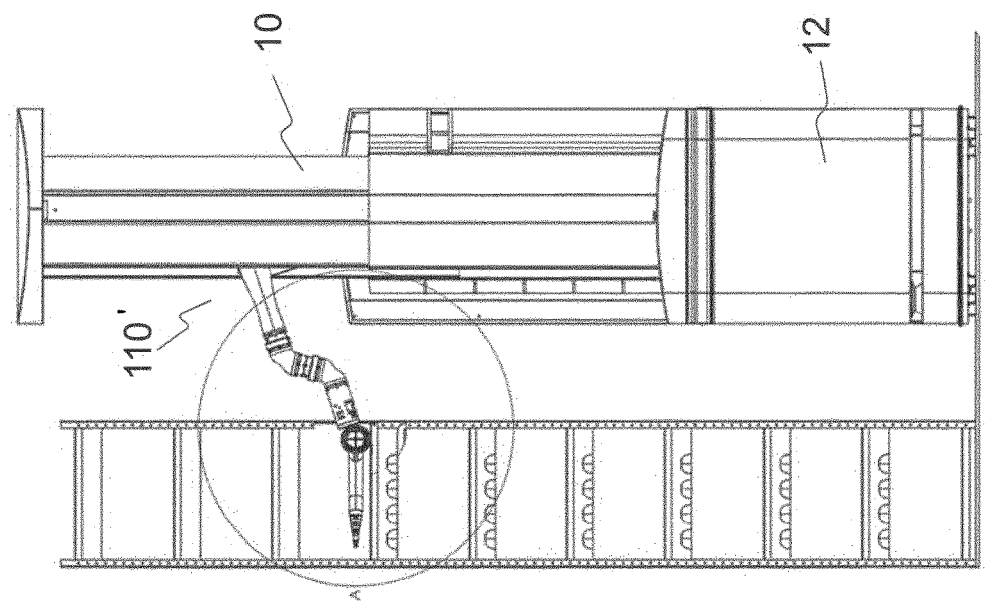
Figure 25:
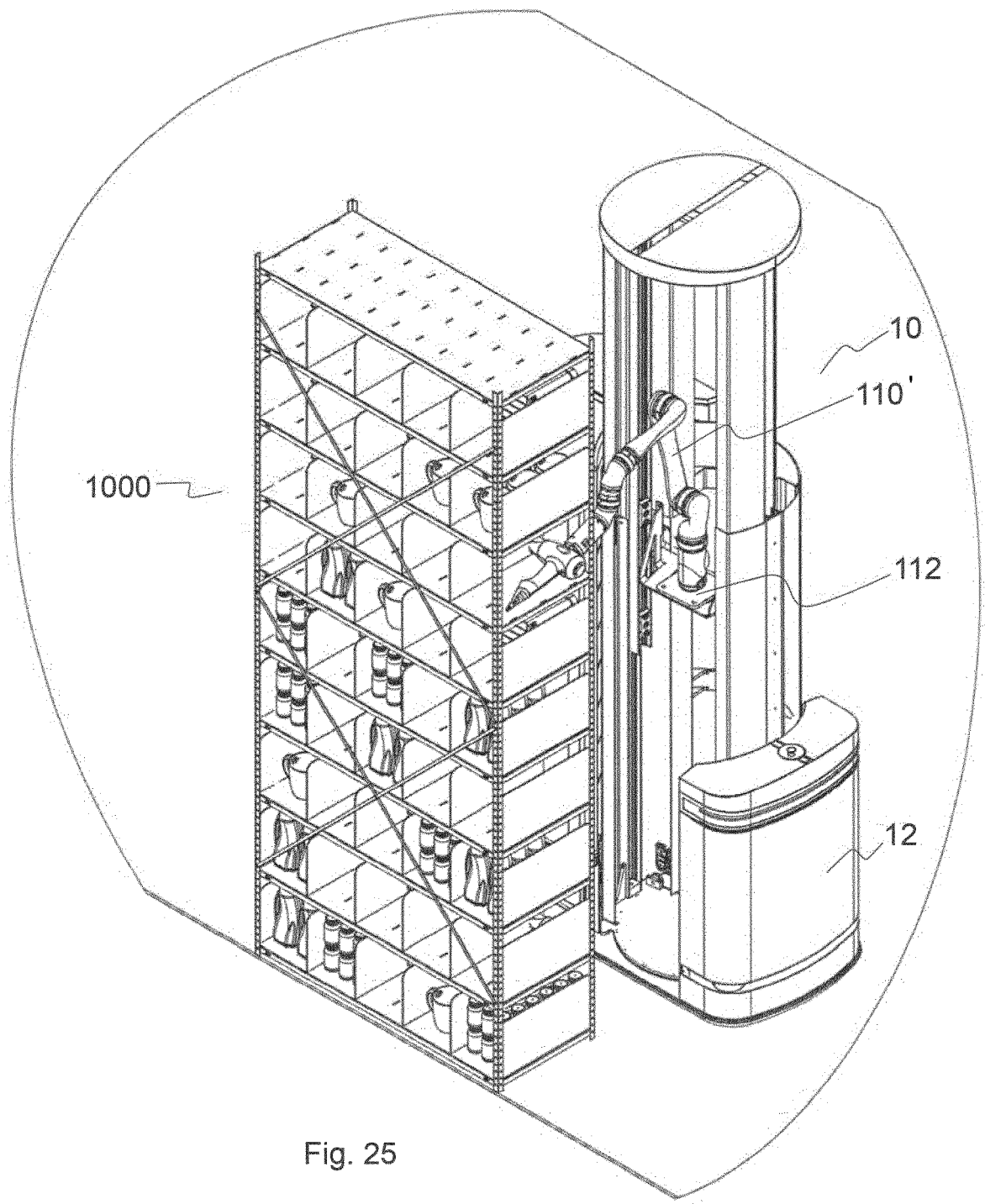
Figure 28:
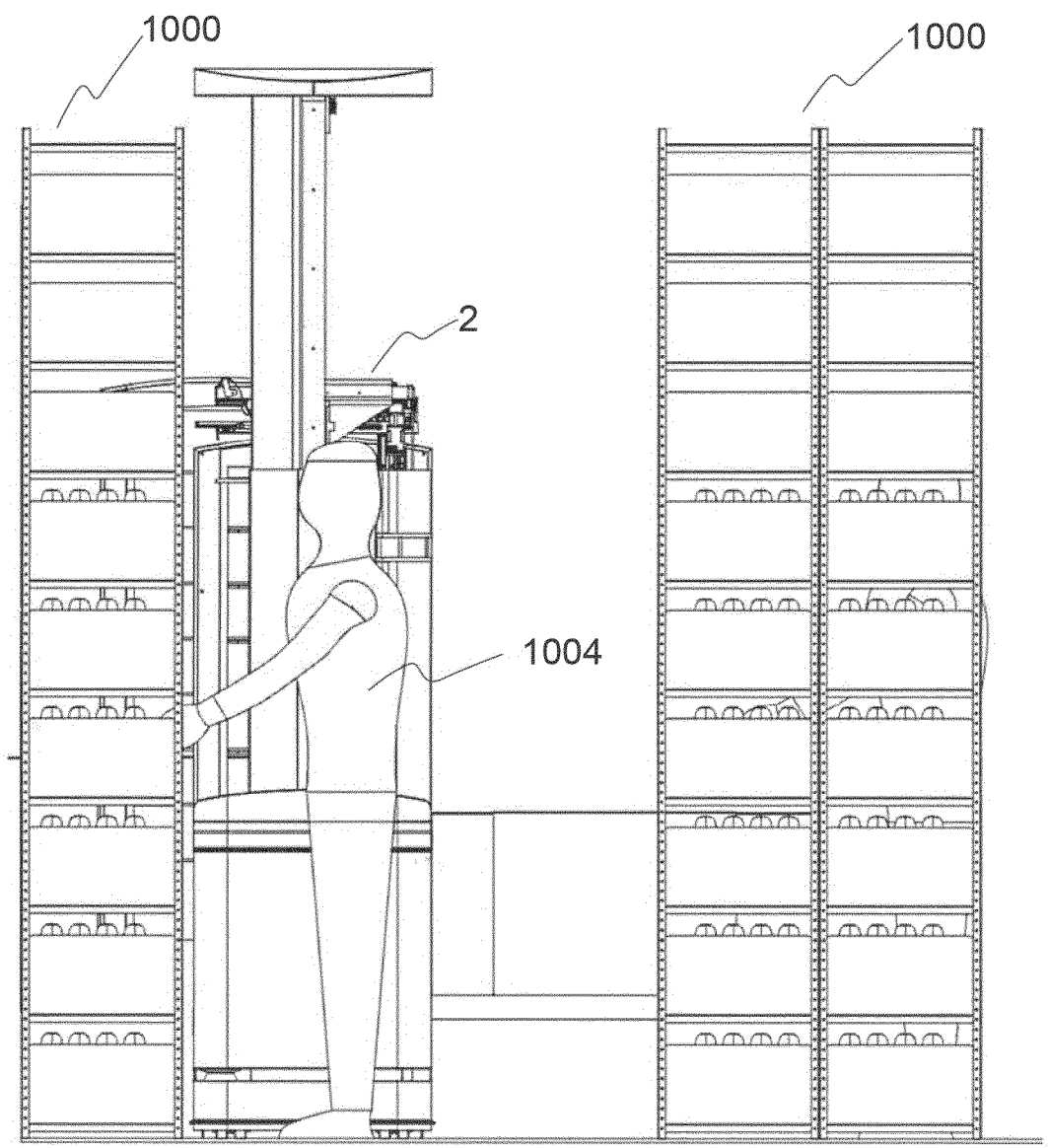
Figure 29:
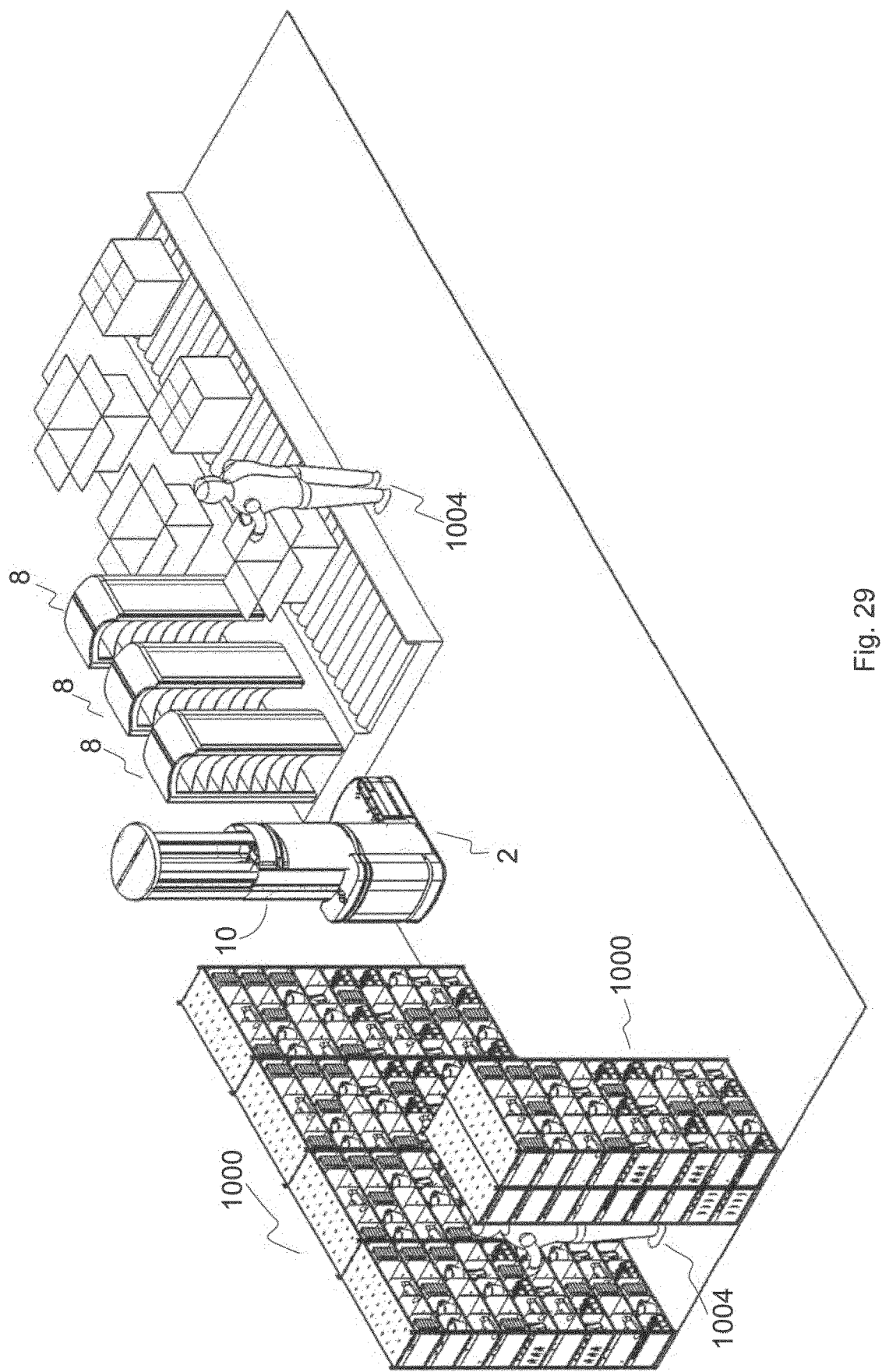
Figure 30:
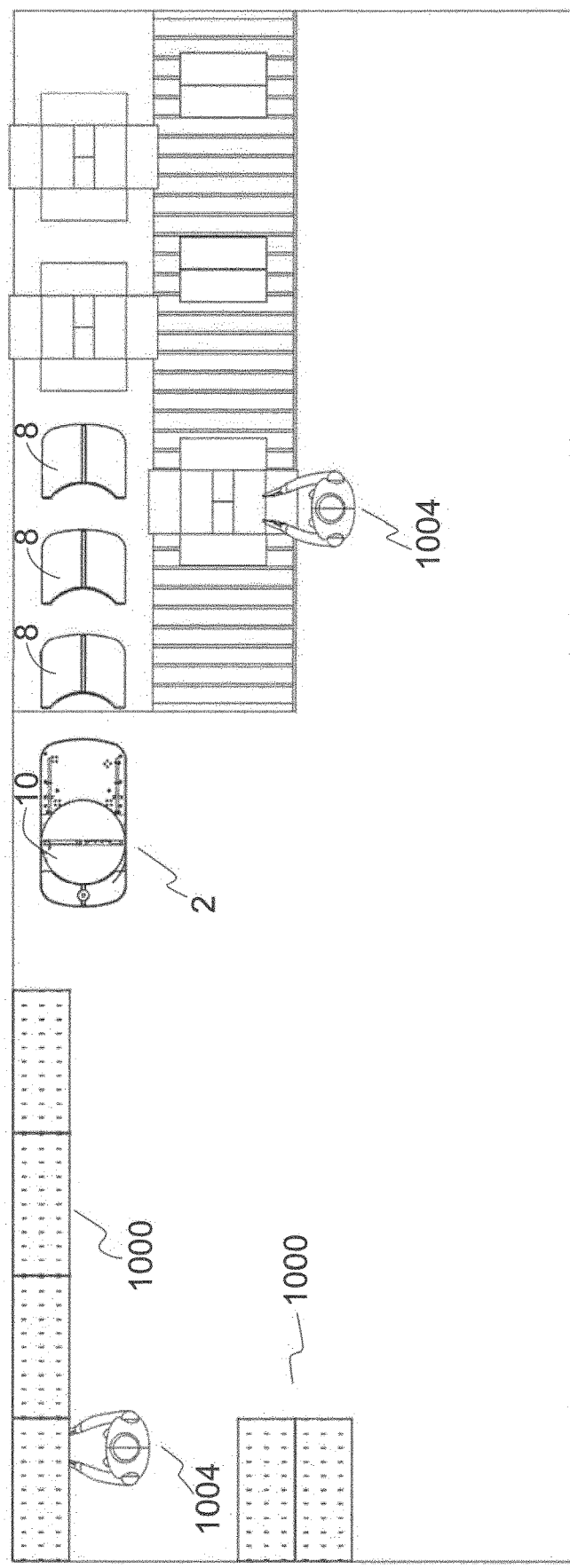

The invention will now be described with reference to the accompanying drawings, which depict embodiments of the present invention. More particularly FIG. 1 depicts a first exemplary robot in a warehouse;
FIG. 2 depicts the first exemplary robot in the warehouse in a rear view;
FIG. 3 depicts the first exemplary robot in the warehouse in a side view;
FIG. 4 depicts the first exemplary robot in a front perspective view;
FIG. 5 depicts the first exemplary robot in a rear perspective view;
FIG. 6 depicts a second exemplary robot in a warehouse;
FIG. 7 depicts the second exemplary robot in the warehouse in a rear view;
FIG. 8 depicts the second exemplary robot in the warehouse in a side view;
FIG. 9 depicts the second exemplary robot in a front perspective view;
FIG. 10 depicts a perspective view of lower parts of the first or second exemplary robot;
FIG. 11 depicts a side view of these parts;
FIG. 12 depicts a bottom view of these parts;
FIG. 13 depicts a top view of parts of a pick up unit used in the exemplary robots;
FIG. 14 depicts a bottom view of these parts;
FIG. 15 depicts a rear perspective view of these parts;
FIG. 16 depicts a rear view of the first exemplary robot;
FIG. 17 depicts a side view of the first and second exemplary robot;
FIG. 18 depicts a front view of the first exemplary robot;
FIG. 19a depicts a side view of the first exemplary robot in front of a shelf starting to grip and object;
FIG. 19b depicts an enlarged section of FIG. 19a;
FIG. 20a depicts a side view of the first exemplary robot in front of the shelf during a gripping operation;
FIG. 20b depicts an enlarged section of FIG. 20a;
FIG. 21 depicts another side view of the first exemplary robot;
FIG. 22 depicts an enlarged section of FIG. 21;
FIG. 23 depicts a side view of the second exemplary robot in front of a shelf;
FIG. 24 depicts an enlarged section of FIG. 23;
FIG. 25 depicts a perspective view of the second exemplary robot in front of a shelf;
FIG. 26 depicts a perspective view of a system using a robot;
FIG. 27 is a top view of the system of FIG. 26;
FIG. 28 is a side view of the system of FIG. 26;
FIG. 29 depicts a perspective view of another system using a robot; and
FIG. 30 is a top view of the system of FIG. 29.

Throughout the description of the drawings, like features are denoted by like reference numerals. However, for ease of illustration and brevity of the description, some reference numerals may be omitted in some of the Figures.

FIG. 1 depicts a robot 2, as well as a plurality of racks or shelves 1000. A plurality of objects 1002 are placed in the racks 1000. In the depicted FIG. 1, the objects 1002 are depicted to be box-shaped objects (such as, for example, books or DVDs or games). The robot 2 is adapted to pick up and transport the objects 1002, e.g. objects 1002 having an overall weight on the order of some kg, such as 3 kg. That is, the robot 2 is a mobile robot 2. The robot 2 comprises a base plate 4, a drive unit 6, a shelf unit 8, a pick up unit 10 and an energy storage unit 12 (which will also be referred to as battery unit 12 in the present embodiments), not all of which are necessary. FIGS. 4 and 5 depict the robot 2, which is also depicted in FIG. 1, in greater detail, from both sides. FIGS. 10 and 11 depict the base plate 4 with additional components of the drive unit 6. All the components and/or units are positioned on the same base plate 4, i.e., they are all mounted to the same base plate 4. Preferably, the drive unit 6, the pick up unit 10 and the battery unit 12 are located side by side, such that these three units are directly connected to the base plate 4. Further preferably, the pick up unit 10 is located on the center of the base plate 4, i.e., between the battery unit 12 and the drive unit 6. In embodiments, the pick up unit 10 may also be referred to as turn and lift unit 10 (or turn and lift post 10), as it may be adapted to lift and rotate an object.

The battery unit 12 typically comprises a battery, such as a rechargeable battery. The battery may be replaceable from the battery unit 12. Furthermore, the battery may also be charged when being placed in the battery unit 12. That is, there may be provided electrical contacts in the battery unit 12 to charge the battery.

Reference will now be made to pick up unit 10, parts of which are also depicted in FIG. 15 showing a perspective view of these parts, as well as FIGS. 13 and 14 showing a top and a bottom view, respectively. Pick up unit 10 comprises a pick up unit support plate 124 (which may also be referred to as pick up unit base). The pick up unit support plate 124 may comprises a sliding ring disposed on its side facing the base plate 4 and allowing the pick up unit support plate 124 to rotate more easily on the base plate 4. On this pick up unit support plate 124, at least one bar (or trail or rack) 102 is mounted. Preferably, there are provided at least two bars or trails 102 and more preferably exactly two bars or trails 102. These bars 102 extend parallel to one another and preferably in a vertical direction during use. That is, the bars 102 extend perpendicular to base plate 4 and pick up unit support plate 124. The bars 102 may be connected by a connection bar 104 on their ends furthest from the pick up unit support plate 124. This connection bar 104 may provide additional stability to the bars 102. Furthermore, there may be provided one or more connector members 122, which may be arched, to provide additional stability to the pick up unit 10. Furthermore, the connector members 122 and/or the connection bar may also be used to house energy chains and/or cables that may be employed in the robot. The pick up unit 10 further comprises a pick up device 110 (not depicted in FIGS. 13 to 15 for clarity of illustration). However, these Figures depict pick up device support unit 1100, which supports the pick up device 110. More particularly, the top view of FIG. 13 depicts the bars 102, the connection bar 104, the connector members 122 and the pick up unit support plate 124. Furthermore, this Figure also depicts a motor unit 140. The motor unit 140 may allow the bars 102 to be telescopable between retracted and extended positions. According to one embodiment, the motor unit 140 may pull a pulley via a rotational spindle, which may cause the bars 102 to be telescopable between retracted and extended positions. However, other mechanisms may also be applied to allow for the telescoping of the bars 102. FIG. 14 depicts parts of the pick up unit 10 from below. Most notably, there is depicted an opening 150 in the pick up unit support plate 124, which opening 150 allows mounting of the pick up unit 10 on rotational drive means 44 (see FIG. 10). The opening 150 centers the pick up unit 10 on the base plate 4. Having the opening 150 also disposed on the upward facing side may be particularly advantageous for servicing. In particular, there may be provided threads in the opening 150 and on the rotational drive means 44 allowing these structures to be connected with one another.

The pick up device 110 is displaceably supported on bars 102. That is, the pick up device 110 may go up and down on bars 102 in a linear manner. Thus, its vertical position may be changed. There may be provided a sensor assembly 1102 on the pick up device 110 adapted to sense the exact location of the objects 1002 to be picked up (see, e.g., FIG. 20). Typically, such a sensor assembly 1002 could comprise at least one camera. The camera may be, for example, a 3D camera or a camera including a depth sensor. By means of such a sensor assembly 1102, the exact location of the object 1002 to be picked up may be sensed. According to a first embodiment, exemplarily depicted in FIGS. 1-5 and 19 to 22, the pick up device 110 may be primarily adapted to pick up regularly shaped objects 1002, such as boxes, books and/or DVDs. As depicted, e.g., in FIGS. 19b and 20b, which are enlarged views of a section of FIGS. 191 and 20a, respectively, the pick up device 110 may comprise a support plate 1104 and a pulling assembly 1106. The support plate 1104 is disposed substantially horizontally. According to one embodiment, it may be extended from the bars 102 in a horizontal direction. Thus, it may be placed under the rack of the shelf where the object 1002 to be picked up is located. It may also be placed on level with the rack of the shelf where the object 1002 to be picked up is located and directly adjacent to this rack. The pulling assembly 1106 comprises a substantially horizontal portion 11062 and a vertical extension 11064 on the distal end of the horizontal portion 11062. The vertical extension 11064 extends downwards from the horizontal portion 11062. The horizontal portion 11062 is extendable and retractable between extended and retracted configurations. Furthermore, the vertical distance between the support plate 1104 and the pulling assembly 1106 is adjustable. To pick up object 1002, the exact location of the object 1002 is sensed by means of sensor assembly 1102, the support plate 1102 is moved into a location under the rack the object 1002 is located on or directly adjacent to said rack. The pulling assembly 1006 is positioned on a vertical position allowing the pulling assembly 1006 to be extended further than the distal end of the object 1002 and the pulling assembly 1006 is extended in such a way (see FIGS. 19a and 19b). The pulling assembly 1006 is then lowered to a point where the vertical extension 11064 may abut the distal end of the object 1002 and the pulling assembly 1106 is retracted (see FIGS. 20a and 20b). This causes the object 1002 to slide onto support plate 1104. The pick up device 110 including the support plate 1104 and the pulling assembly 1106 may be retracted, such that the pick up assembly 110 together with the object 1002 is retracted to a location, e.g., in between the bars 102. FIGS. 21 and 22 depict a similar configuration as do FIGS. 20a and 20b. However, FIGS. 21 and 22 depict the pick up device 110 being rotated by 90° with respect to FIGS. 20a and 20b. In this configuration, the pick up device 110 may pick up objects 1102 from the shelf unit 8 of the robot 2. As the mechanism is substantially identical to the mechanism employed for picking up an object from an external shelf 1000, it will not be described in further detail. Although not depicted, it is noted that the described pick up device 110 may also comprise a pushing assembly. The pushing assembly is adapted to push objects away from pick up device 110 and more particularly from support plate 1104. E.g., in the state depicted in FIG. 20, the vertical position of the pulling assembly 1106 could be changed such that the vertical extension 11064 does no longer engage the object 1002. Pushing assembly may then be used to push the object 1002 from a location on the support plate 1104 to the external shelf 1000. In particular, such a pushing assembly can be used to locate objects picked up from an external shelf 1000 into the shelf unit 8 of the robot. Additionally or alternatively, the support plate 1104 and the pulling assembly 1106 could be used to locate objects that have been picked up on an external rack 1000 or on a shelf unit 8. The above described pick up mechanism would then be used in reverse. That is, the support plate 1104 would be extended such that an object 1002 placed thereon is positioned directly above the desired location the object 1002 is to be disposed (e.g. on external shelf 1000 or in shelf unit 8). The vertical extension 11064 of the pulling assembly 1106 would then be positioned directly "behind" the object 1002, i.e. the vertical extension 11064 would be more inward than the object 1002, and the support plate 1104 would be retracted.

The object 1002 abuts the vertical extension 11064 preventing that the object 1002 is also retracted. When the support plate's distal end is retracted beyond the location of the vertical extension 11064, the object 1002 will no longer be supported on support plate 1104, but will be placed on the desired location.

Although not depicted, the pick up unit 10 may also comprise a housing. In particular, such a housing may enclose the pick up unit 10 on a rear side of the robot 2, i.e., on the side opposite to the side where the pick up unit 10 and device 110, 110' is adapted to pick up objects 1002.

FIGS. 6-9 and 23 to 25 depict a second embodiment, where the pick up device 110' comprises a base unit 112 and a robotic arm 114 provided with one or more hinges 116 and a gripper 118 located on the distal end of the robotic arm 114. The pick up device 110' may also comprise a sensor assembly as described above. The gripper 118 may be a classical gripper that truly grips the object 1002 to be picked up or a suction device that "grips" the object 1002 by means of suction supplied to the object 1002. Such grippers may be adapted to grip irregularly shaped objects, e.g. hair dryer 1002'. Combinations of gripping and suction are also envisaged by the present technology. Again, pick up device 110' is supported on bars or trails 102 such that the vertical position of base unit 112 can be altered in a linear manner.

Reference is now made to the base plate 4, primarily depicted in FIGS. 10-12. The base plate 4 has a receiving portion 42 for receiving the pick up unit support plate 124. There is also provided a rotational drive means 44 adapted to rotate the pick up unit support plate 124 when it is mounted to the base plate 4. The robot 2 also comprises a plurality of wheels 46, 48. In the present embodiment, there are two wheels 46, each of which is driven by a respective motor, whereas the wheels 48, which are four double wheels in the present embodiment (see FIG. 12) are passive wheels, which are not driven by a motor, but which react passively to forces, e.g., to the forces supplied by means of the motors and wheels 46. As will be appreciated, by individually driving the wheels 46, the location of the base plate 4 and hence the robot 2 may be altered, as may be its orientation. Typically, the described motors form part of the drive unit 6. Preferably, the motors are located coaxially and act as a differential drive. The motor driven wheels 46 are typically pressed towards the ground by means of suitable spring elements to thereby transmit drive torque to the ground.

The depicted robots 2 may also comprise one or more (such as two) sensors adapted to sense obstacles in the way the robot 2 is travelling. Furthermore, the robots 2 may also comprise a projecting means projecting the route the robot 2 is going onto the floor in front of the robot 2. This may conveniently indicate the route of the robot 2 to users and other humans. All these means may be employed as safety measures for the robot 2 to prevent collisions, particularly with humans.

A common operation of a robot 2 of the present technology will now be described. Robot 2 typically is an autonomously driven robot, that may be used in the consignment or picking of objects 1002. For example, the robot 2 may be used in a warehouse, wherein a plurality of different objects 1002 is stored. It may be required to pick up different objects A, B, C and to bring the respective objects to a particular location, e.g., for shipping the respective objects. Such tasks may be communicated to a data receiving and transmitting means, comprised in drive unit 6. The drive unit 6 typically also comprises a processor. There may be provided a memory of where the respective objects are stored in the warehouse. A route may be calculated comprising the locations of objects A, B and C. The robot 2 may then navigate and go to the first object A to be picked up by means of the drive unit 6 driving the respective wheels 46. Once the robot 2 is located in front of the rack 1000, where the correct object A is stored, the robot 2 may stop and cause the pick up unit 10 to pick up the respective object 1002. More particularly, once the robot 2 is in front of the correct rack 1000, the pick up device 110 may be brought to the correct vertical location by moving along the bars 102. The object 1002 may then be picked up and the pick up device 110, 110' may be retracted. As discussed, the robot 2 also comprises a shelf unit 8. The shelf unit 8 may be replaceable, i.e., the shelf unit 8 may be mounted to and un-mounted from the remainder of the robot 2. This may be done by the user of the robot 2. However, the robot 2 may also be adapted to mount and un-mount the shelf unit 8. As depicted, e.g., in FIGS. 21 and 22, the shelf unit 8 typically comprises a plurality of compartments, e.g., by means of shelf or case boards 82. The boards 82 may be located on different heights in the shelf unit 2 and their positions may be changeable. In particular, the robot 2 may be adapted to change the positions of the boards 82. Thus, the shelf unit 2 may be adaptable to meet different needs and to house and/or transport different objects 1002 (having different shapes and sizes). Furthermore, the shelf unit 8 may also comprise a housing enclosing the shelf unit 8 such that only the side facing towards the pick up unit 10 remains open. The shelf unit 8 typically extends to a height in a range of 150 cm to 200 cm, preferably 160 cm to 190 cm and most preferably 170 cm to 180 cm. By means of the shelf unit 8, a plurality of objects 1002 may be stored in the robot 2. That is, after picking up the object 1002, the robot 2 may place the object 1002 in the shelf unit 8. To do so, the pick up device 110 is brought into the correct vertical location of the shelf compartment the object 1002 is to be stored in by means of the bars 102. The pick up unit 10 is then (although the sequence of the steps is not a necessity) rotated by means of the pick up unit support plate 124 being rotated with respect to base plate 4. The pick up device 110, 110' is then extended to the respective compartment of the shelf unit 8 to place the object 1002 into this shelf compartment. After this procedure has been performed for object A, it is repeated for objects B and C. That is, in short words, the robot 2 drives to object B, picks it up and places it into the shelf unit 8, drives to object C and places it into the shelf unit 8 and then brings all the objects to the desired location, e.g., the location for shipping.

Some preferred features of the robot 2 of the present technology will now be described. According to a preferred embodiment, the described bars or trails 102, by means of which the described pick up device 110 may be moved in the vertical direction, i.e., they may be telescopable. That is, there may be an extended configuration of the bars or trails 102 and a retracted configuration. Preferably, there may be a plurality of such configurations. An extended configuration is depicted, e.g., in FIGS. 1-3 and a further retracted configuration is depicted in FIGS. 4 and 5. FIGS. 7-8 also show an extended configuration, and FIG. 9 a further retracted configuration. By means of this, the pick up device 110 may be adapted to pick up objects 1002, located at a greater height then would be possible if the bars or trails 102 would not be extendible, while, at the same time, allowing the robot 2 to go via areas of decreased height. For example, the height of the robot 2 with the bars or trails 102 fully retracted may be 1.73 m and the overall height of the robot 2 may be 2.60 m in the fully extended configuration. Such a configuration would be particularly useful, e.g., in a warehouse having a roof with beams or bars 1004 having a clearance or pass line height which is lower than the highest rack—e.g., FIG. 3 depicts such a beam or bar 1004 with a clearance being lower than the height of the robot 2 with the bars 102 in the extended configuration. As will also be appreciated by the figures, drive unit 6 and pick up unit 10 are oriented side by side on the base plate 4. This is particularly advantageous, as by means of this configuration, the bars or trails 102 may extend all the way down to the base plate 4, thereby allowing the pick up device 110 to go down all the way to the base plate 4 to thereby be able to also pick up objects 1002, which are located adjacent the floor. In this regard, particular reference is also made to FIG. 11, illustrating that the base plate 4 is located very close to the floor. Generally speaking, the base plate 4 has two surfaces 402 and 404. During use, one of the surfaces, i.e., surface 402, faces downwardly and is therefore called downward-facing surface. Surface 404 is opposite to surface 402 and is therefore called upward-facing surface. The drive unit 6, the shelf unit 8 and the pick up unit 10 are located on the side of the upward-facing surface. As will be appreciated, e.g., from FIG. 11, the upward-facing surface 404 of the base plate 4 may be disposed close to the ground and may preferably be located not more than 10 cm from the ground, such as being disposed 6 or 7 cm from the ground. The motor-driven wheels 46 may extend through the base plate 4 and preferably in such a way that at least 25%, further preferred 50% and further still preferred 75%, such as approximately 90% of the vertical diameter (which diameter may be approximately 20 cm) of the wheels are disposed above the upward-facing surface 404 of the base plate 4. All these measures may be applied to locate the upward-facing surface 404 relatively close to the floor. This allows the pick up device 110 to be moveable to a location close to the ground to pick up objects close to the ground. This may be particularly advantageous, as it allows the robot 2 to pick up objects from very low locations. According to the present embodiment, the motor-driven wheels 46 extend through apertures in the base plate 4.

Furthermore, it will be appreciated that components substantially contributing to the overall weight of the robot 2 are the drive unit 6, the pick up unit 10 and the battery unit 12. By placing these units side by side to one another (instead of, e.g., placing one on top of the other) a height of the centre of mass may be reduced, which increases stability of the robot, too. It is preferred that the robot comprises a configuration (e.g., fully extended or fully rejected), wherein the centre of mass is located in the lower 75%, preferably within the lower 50% and further preferably within the lower 25% of the robot.

FIGS. 26 to 28 depict a robot 2 used in a warehouse having a plurality of shelves 1000 and a plurality of objects stored in the shelves 1000. Furthermore, these Figure also depict humans 1004. As described, the robot 2 may comprise a sensor to sense obstacles, such as humans 1004, which may allow a save interaction between humans 1004 and robots 2, allowing the robots 2 to be used side by side to humans 1004. Furthermore, as will be appreciated particularly from FIGS. 27 and 28, the robot 2 typically has such a width (e.g. approximately 60 cm) allowing a human 1004 to pass between the robot 2 and an external shelf 1000. Furthermore, this may also enable two robots 2 to pass in the space delimited by two external shelves 1000, allowing multiple robots 2 to be used in a warehouse. FIGS. 30 and 31 also depict a plurality of robot shelf units 8, one of which is mounted to the robot 2. Three other shelf units 8 are currently not mounted to the robot 2, but are positioned at a location where a user 1004 may take out objects and place them in boxes for shipping.

This is also depicted in FIGS. 29 and 30. Again, these Figures depict a plurality of external shelves or racks 1000 storing a plurality of objects. There are further depicted humans 1004 working and a robot 2, as well as a plurality of shelf units 8 which may be mounted to the robot 2. That is, this embodiment also relates to the shelf units 8 being removable from the robot 2. In particular, the robot 2 itself may mount and/or un-mount the shelf units 8 to and/or from the remainder of the robot 2, e.g. by means of the pick up unit 10 and in a similar way as other objects can be picked up by the robot 2. However, the mounting and un-mounting of the shelf unit 8 to and from the robot 2 may also be performed by a user 1004.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "essentially radial" shall also cover exactly radial).

While the invention has been described with reference to the embodiments, it will be understood that these embodiments should not be construed to limit the scope of the invention, which is defined by the claims.

The invention claimed is:

1. A robot adapted to pick up and transport objects comprising
    a base plate,
    a drive unit, and
    a pick up unit comprising;
        at least one bar positioned perpendicular to the base plate,
        a pick up device adapted to pick up and release objects,
        a pick up unit support plate, which is rotatably mounted on the base plate, and
        a housing enclosing the pick up unit on a side opposite to a side where the pick up device is adapted to pick up the objects;
    wherein
        the pick up device is linearly moveable along the at least one bar,
        the robot is adapted to rotate the pick up device around an axis perpendicular to the base plate,
        the at least one bar is mounted on the pick up unit support plate, and
        the at least one bar is telescopable between a retracted and an extended position.

2. The robot according to claim 1, wherein the robot further comprises a shelf unit, and
    wherein the drive unit, the pick up unit and the shelf unit are positioned on the base plate.

3. The robot according to claim 2, wherein the shelf unit is located on top of the drive unit.

4. The robot according to claim 1, wherein the drive unit and the pick up unit are located side by side to one another.

5. The robot according to claim 1, wherein the base plate has a thickness not exceeding 40 mm.

6. The robot according to claim 1, wherein the robot further comprises a plurality of wheels and at least one motor driving at least one of the wheels, wherein the at least one wheel driven by the at least one motor extends through the base plate.

7. The robot according to claim 6, wherein a portion of the diameter of the at least one motor driven wheel is disposed above the base plate, wherein this portion is at least 25%.

8. The robot according to claim 1, wherein the base plate comprises a downward facing surface adapted to face to the ground in use and an upward facing surface opposite to the downward facing surface, wherein the upward facing surface in use is distanced from the ground by a distance not exceeding 100 mm.

9. The robot according to claim 1, wherein the robot has a maximum height in the range of 150 to 350 cm and wherein the robot comprises a center of mass, which in use is distanced from the ground by a distance not exceeding 100 cm.

10. A method of transporting at least one object, comprising:
   providing the robot according to claim 1;
   the robot going to a first storing location where a first object is stored;
   the robot picking up the first object; and
   the robot transporting the first object to a first destiny location.

11. The method according to claim 1, the method further comprising:
   the robot placing the first object in the shelf unit;
   the robot going to a second storing location where a second object is stored; and
   the robot picking up the second object after the robot has placed the first object in the shelf unit.

* * * * *